(12) United States Patent
Schowengerdt et al.

(10) Patent No.: US 11,016,298 B2
(45) Date of Patent: May 25, 2021

(54) MICROLENS COLLIMATOR FOR SCANNING OPTICAL FIBER IN VIRTUAL/AUGMENTED REALITY SYSTEM

(71) Applicant: Magic Leap, Inc., Dania Beach, FL (US)

(72) Inventors: Brian T. Schowengerdt, Seattle, WA (US); Lionel Ernest Edwin, Hollywood, FL (US); Ivan Yeoh, Fort Lauderdale, FL (US); Aaron Mark Schuelke, Coral Springs, FL (US); William Hudson Welch, Fort Lauderdale, FL (US); John Graham Macnamara, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/286,215

(22) Filed: Oct. 5, 2016

(65) Prior Publication Data

US 2017/0097506 A1    Apr. 6, 2017

Related U.S. Application Data

(60) Provisional application No. 62/237,189, filed on Oct. 5, 2015.

(51) Int. Cl.
*G02B 6/34* (2006.01)
*G02B 6/32* (2006.01)
(Continued)

(52) U.S. Cl.
CPC ......... *G02B 27/0172* (2013.01); *G02B 6/003* (2013.01); *G02B 6/0015* (2013.01);
(Continued)

(58) Field of Classification Search
CPC ....... G06T 19/20; G06T 19/006; G06T 13/20; G06T 15/005; G02B 27/0172;
(Continued)

(56) References Cited

U.S. PATENT DOCUMENTS 1,679,086 A    7/1928    Jenkins
4,274,854 A    6/1981    Pleibel et al.
(Continued)

FOREIGN PATENT DOCUMENTS

EP    0785457 A2    7/1997
EP    0785457 A3    7/1997
(Continued)

OTHER PUBLICATIONS

Non-Final Office Action for U.S. Appl. No. 14/156,366 dated Sep. 3, 2015.
(Continued)

*Primary Examiner* — Kaveh C Kianni
*Assistant Examiner* — Hung Q Lam
(74) *Attorney, Agent, or Firm* — Vista IP Law Group LLP

(57) ABSTRACT

A display subsystem for a virtual image generation system for use by an end user comprises a planar waveguide apparatus, an optical fiber, at least one light source configured for emitting light from a distal end of the optical fiber, and a collimation element mounted to a distal end of the optical fiber for collimating light from the optical fiber. The virtual image generation system further comprises a mechanical drive assembly to which the optical fiber is mounted to the drive assembly. The mechanical drive assembly is configured for displacing the distal end of the optical fiber, along with the collimation element, in accordance with a scan pattern. The virtual image generation system further comprises an optical waveguide input apparatus configured for directing the collimated light from the collimation ele-
(Continued)

ment down the planar waveguide apparatus, such that the planar waveguide apparatus displays image frames to the end user.

19 Claims, 18 Drawing Sheets

(51) Int. Cl.
| | |
|---|---|
| G02B 6/42 | (2006.01) |
| G02B 6/10 | (2006.01) |
| G02B 27/01 | (2006.01) |
| F21V 8/00 | (2006.01) |
| G02B 26/10 | (2006.01) |
| G06T 15/00 | (2011.01) |
| G06T 19/00 | (2011.01) |
| G06F 3/01 | (2006.01) |

(52) U.S. Cl.
CPC ......... *G02B 6/0026* (2013.01); *G02B 6/0028* (2013.01); *G02B 6/0031* (2013.01); *G02B 6/0076* (2013.01); *G02B 26/103* (2013.01); *G06T 15/005* (2013.01); *G06T 19/006* (2013.01); *G02B 2027/0125* (2013.01); *G02B 2027/0178* (2013.01); *G06F 3/012* (2013.01); *G06F 3/013* (2013.01)

(58) Field of Classification Search
CPC ............... G02B 6/0026; G02B 27/017; G02B 27/0174; G02B 6/0031; G02B 6/0076; G02B 6/0015; G02B 6/0028
USPC ................ 385/25, 34–37, 49, 50, 129–132
See application file for complete search history.

(56) References Cited

U.S. PATENT DOCUMENTS

| | | | |
|---|---|---|---|
| 4,832,464 A | 5/1989 | Kato et al. | |
| 4,955,687 A | 9/1990 | Pafford | |
| 5,033,814 A | 7/1991 | Brown et al. | |
| 5,729,242 A | 3/1998 | Margerum et al. | |
| 5,764,317 A | 6/1998 | Sadovnik et al. | |
| 5,949,941 A | 9/1999 | DiGiovanni | |
| 6,046,720 A | 4/2000 | Melville et al. | |
| 6,294,775 B1* | 9/2001 | Seibel .................. | A61B 1/0008 250/208.1 |
| 6,385,358 B1 | 5/2002 | Everett et al. | |
| 6,643,065 B1 | 11/2003 | Silberman | |
| 6,845,190 B1 | 1/2005 | Smithwick et al. | |
| 6,959,130 B2 | 10/2005 | Fauver et al. | |
| 7,189,961 B2 | 3/2007 | Johnston et al. | |
| 7,555,333 B2 | 6/2009 | Wang et al. | |
| 7,608,842 B2 | 10/2009 | Johnston | |
| 7,784,697 B2 | 8/2010 | Johnston et al. | |
| 8,248,458 B2 | 8/2012 | Schowengerdt et al. | |
| 8,372,004 B2 | 2/2013 | Krattiger | |
| 8,467,133 B2 | 6/2013 | Miller | |
| 8,469,525 B2 | 6/2013 | Kojima et al. | |
| 8,472,120 B2 | 6/2013 | Border et al. | |
| 8,757,812 B2 | 6/2014 | Melville et al. | |
| 9,014,517 B2 | 4/2015 | Katakura et al. | |
| 9,310,559 B2* | 4/2016 | Macnamara ............ | G02B 6/262 |
| 9,389,424 B1 | 7/2016 | Schowengerdt | |
| 9,417,452 B2 | 8/2016 | Schowengerdt et al. | |
| 9,457,412 B2 | 8/2016 | Schowengerdt et al. | |
| 9,612,403 B2 | 4/2017 | Abovitz et al. | |
| 9,671,566 B2 | 6/2017 | Abovitz et al. | |
| 10,254,536 B2 | 4/2019 | Yeoh et al. | |
| 10,317,690 B2 | 6/2019 | Cheng | |
| 10,338,391 B2 | 7/2019 | Yeoh et al. | |
| 1,038,663 A1 | 8/2019 | Welch | |
| 2001/0013960 A1 | 8/2001 | Popovich et al. | |
| 2002/0110077 A1 | 8/2002 | Drobot et al. | |
| 2003/0020879 A1 | 1/2003 | Sonehara | |
| 2003/0169405 A1 | 9/2003 | Agostinelli et al. | |
| 2004/0151466 A1 | 8/2004 | Crossman-Bosworth et al. | |
| 2004/0179764 A1 | 9/2004 | Melikechi et al. | |
| 2004/0258341 A1 | 12/2004 | Paolucci et al. | |
| 2005/0173817 A1* | 8/2005 | Fauver ..................... | G02B 6/25 264/1.26 |
| 2005/0213103 A1 | 9/2005 | Everett et al. | |
| 2005/0230641 A1 | 10/2005 | Chun et al. | |
| 2006/0072843 A1 | 4/2006 | Johnston | |
| 2006/0171647 A1 | 8/2006 | Ye et al. | |
| 2007/0154153 A1 | 7/2007 | Fomitchov et al. | |
| 2008/0221388 A1 | 9/2008 | Seibel et al. | |
| 2009/0316116 A1 | 12/2009 | Melville et al. | |
| 2010/0289970 A1 | 11/2010 | Watanabe | |
| 2011/0032602 A1 | 2/2011 | Rothenberg | |
| 2011/0201941 A1 | 8/2011 | Van Gaal et al. | |
| 2011/0240607 A1 | 10/2011 | Stecker et al. | |
| 2011/0274435 A1 | 11/2011 | Fini et al. | |
| 2012/0075534 A1 | 3/2012 | Katz et al. | |
| 2012/0113092 A1 | 5/2012 | Bar-Zeev et al. | |
| 2013/0128230 A1 | 5/2013 | Macnamara | |
| 2013/0300999 A1 | 11/2013 | DeJong et al. | |
| 2014/0055844 A1 | 2/2014 | Cormier et al. | |
| 2014/0140653 A1 | 5/2014 | Brown et al. | |
| 2014/0177021 A1 | 6/2014 | Shimamoto | |
| 2014/0184477 A1 | 7/2014 | Hino et al. | |
| 2014/0211322 A1* | 7/2014 | Bohn .................. | G02B 27/0081 359/633 |
| 2014/0236022 A1 | 8/2014 | Zeng et al. | |
| 2014/0306866 A1 | 10/2014 | Miller et al. | |
| 2015/0009357 A1 | 1/2015 | Seibel et al. | |
| 2015/0016777 A1* | 1/2015 | Abovitz .................. | G02B 27/225 385/37 |
| 2015/0087257 A1* | 3/2015 | Balram .................. | H04W 4/12 455/404.1 |
| 2015/0168702 A1* | 6/2015 | Harris ..................... | G02B 21/08 850/30 |
| 2015/0178939 A1 | 6/2015 | Bradski et al. | |
| 2015/0205126 A1* | 7/2015 | Schowengerdt ..... | G06K 9/0061 345/633 |
| 2015/0222884 A1 | 8/2015 | Cheng | |
| 2015/0268415 A1 | 9/2015 | Schowengerdt et al. | |
| 2015/0309264 A1 | 10/2015 | Abovitz et al. | |
| 2015/0346495 A1 | 12/2015 | Welch et al. | |
| 2016/0026253 A1* | 1/2016 | Bradski ................ | G02B 27/225 345/8 |
| 2017/0038579 A1 | 2/2017 | Yeoh et al. | |
| 2017/0097507 A1 | 4/2017 | Yeoh et al. | |
| 2017/0208297 A1 | 7/2017 | Yeoh et al. | |
| 2020/0145625 A1 | 5/2020 | Yeoh | |

FOREIGN PATENT DOCUMENTS

| | | |
|---|---|---|
| JP | 03-198022 | 12/1989 |
| JP | 06-229825 | 2/1993 |
| JP | H05297313 | 11/1993 |
| JP | 2003-107402 | 4/2003 |
| JP | 2010-008948 | 1/2010 |
| JP | 2014-17776 | 1/2014 |
| WO | WO 03081320 | 10/2003 |
| WO | WO 2006/070308 | 7/2006 |
| WO | WO 20090014525 | 1/2009 |
| WO | 20130188464 A1 | 12/2013 |
| WO | 20140151877 A1 | 9/2014 |
| WO | WO 2014144526 | 9/2014 |
| WO | 20150081313 A2 | 6/2015 |

OTHER PUBLICATIONS

Final Office Action for U.S. Appl. No. 14/156,366 dated Apr. 1, 2016.
PCT International Search Report and Written Opinion for International Appln. No. PCT/US14/11736, Applicant Magic Leap, Inc., dated May 8, 2014 (11 pages).
Non-Final Office Action for U.S. Appl. No. 14/611,162 dated Dec. 7, 2016.

(56) References Cited

OTHER PUBLICATIONS

Response to Non-Final Office Action for U.S. Appl. No. 14/611,162 dated Apr. 7, 2017.
Final Office Action for U.S. Appl. No. 14/611,162 dated Jul. 24, 2017.
PCT International Search Report and Written Opinion for International Appln. No. PCT/US15/13998, Applicant Magic Leap, Inc., dated May 1, 2015 (9 pages).
Notice of Allowance for U.S. Appl. No. 14/677,931 dated Feb. 12, 2016.
PCT International Search Report and Written Opinion for International Appln. No. PCT/US2016/043001, Applicant Magic Leap, Inc., dated Sep. 22, 2016 (9 pages).
PCT International Search Report and Written Opinion for International Appln. No. PCT/US2016/055823, Applicant Magic Leap, Inc., dated Dec. 20, 2016 (9 pages).
PCT International Search Report and Written Opinion for International Appln. No. PCT/US2017/14138, Applicant Magic Leap, Inc., dated May 24, 2017 (11 pages).
PCT International Search Report and Written Opinion of the ISA for PCT/US2016/055539, Applicant Magic Leap, Inc., dated Dec. 23, 2016, (12 pages).
Non-Final Office Action filed May 23, 2018 for U.S. Appl. No. 15/287,637.
Final Office Action dated Jun. 5, 2018 for U.S. Appl. No. 15/214,319.
Non Final office action dated Jun. 18, 2018 for U.S. Appl. No. 15/410,456.
Response to Final Office Action for U.S. Appl. No. 15/214,319 filed Aug. 6, 2018.
Non Final office action dated Jun. 27, 2018 for U.S. Appl. No. 14/611,162.
Response to Final Office Action for U.S. Appl. No. 14/611,162 filed Sep. 22, 2017.
Extended European Search Report for EP Application No. 15743704.7 dated Sep. 8, 2017.
Schowengerdt, B., et al., "3D Displays Using Scanning Laser Projection," Department of Mechanical Engineering, University of Washington, ISSN 0097-966XX/12/4302, dated 2012 (4 pages).
Non-Final Office Action for U.S. Appl. No. 15/410,456 dated Nov. 3, 2017.
Non-Final Office Action for U.S. Appl. No. 15/214,319 dated Oct. 11, 2017.
Non-Final Office Action for U.S. Appl. No. 15/287,637 dated Oct. 6, 2017.
Advisory Action daetd Oct. 26, 2017 for U.S. Appl. No. 14/611,162.
Amendment and Response accompanying RCE for U.S. Appl. No. 14/611,162 filed Nov. 22, 2017.
Amendment and Response to Non-Final Office Action for U.S. Appl. No. 15/287,637 filed Jan. 8, 2018.
Amendment and Response to Non-Final Office Action for U.S. Appl. No. 15/214,319 filed Jan. 11, 2018.
Response to Non-Final Office Action filed Feb. 5, 2018 for U.S. Appl. No. 15/410,456.
Response to European Office Action for EP Appl. No. 15743704.7 dated Mar. 29, 2018.
Response to Non-Final Office Action for U.S. Appl. No. 15/287,637 filed Aug. 23, 2018.
Office Action ated Jul. 20, 2018 for Chinese Application No. 201580017626.6, including translation provided by Chinese associate.
Response to Non-Final Office Action for U.S. Appl. No. 15/410,456 filed Sep. 17, 2018.
Extended European Search Report for Ep Application No. 16854353.6 dated Sep. 14, 2018.
Notice of Allowance dated Sep. 25, 2018 for U.S. Appl. No. 15/214,319.
Response to Non-Final Office Action for U.S. Appl. No. 14/611,162 filed Sep. 26, 2018.
Extended European Search Report dated Sep. 27, 2018 for EP Application No. 16854232.2.
Office Action dated Sep. 21, 2018 for Japanese Application No. 2016-549347, including translation provided by Japanese associate.
Extended European Search Report dated Nov. 20, 2018 for EP Application No. 16828424.8.
Office Action dated Nov. 29, 2018 for Japanese Application No. 2016-549347, including translation provided by Japanese associate.
Office Action dated Dec. 3, 2018 for Chinese Application No. 201580017626.6, including translated claims.
Notice of Allowance for U.S. Appl. No. 15/214,319 dated Dec. 3, 2018.
Extended European Search Report dated Dec. 19, 2018 for EP Application No. 17741926.4.
Notice of Allowance dated Jan. 24, 2019 for U.S. Appl. No. 14/611,162.
Advisory Action dated May 15, 2019 for U.S. Appl. No. 15/410,456.
Response to Final Office Action filed Jul. 26, 2019 for U.S. Appl. No. 15/410,456.
Examination Report for European Application No. 15743704.7 dated Aug. 1, 2019, 6 pages.
Examination Report for New Zealand Application No. 722904 dated Feb. 7, 2020, 2 pages.
Response to Office Action filed Mar. 10, 2020 for Chinese Patent Application No. 201780007235.5, no English translation, (5 pages).
Office Action dated Jan. 29, 2020 for Japanese Patent Application No. 2019-65723, including English translation, (10 pages).
Cited Ref2 for Japanese Patent Application No. 2019-65723, no English translation, (11 pages).
Office Action dated Jan. 6, 2020 for Chinese Patent Application No. 201680042281.4, including English translation, (15 pages).
Final office Action dated Jan. 28, 2019 for U.S. Appl. No. 15/410,456.
Notice of Allowance dated Mar. 5, 2019 for Japanese Patent Application No. 2016-549347.
Notice of Allowance dated Jan. 25, 2019 for U.S. Appl. No. 15/287,637.
Response to Final Office Action for U.S. Appl. No. 15/410,456 filed Mar. 27, 2019.
Response to Extended European Search Report for European Patent Application No. 16854353.6 filed Apr. 2, 2019.
Notice of Allowance dated May 6, 2019 for Chinese Patent Application No. 201580017626.6, no English Translation.
First Examination Report dated May 3, 2019 for Australian Patent Application No. 2015210708.
Response to Extended European Search Report for European Patent Application No. 16828424.8 filed Jun. 13, 2019.
Response to Extended European Search Report for European Patent Application No. 17741926.4 filed Jul. 17, 2019.
Notice of Allowance dated Oct. 9, 2019 for U.S. Appl. No. 15/410,456.
Response to Examination Report for European Application No. 15743704.7 filed Dec. 10, 2019, 10 pages.
Response to Examination Report for Australian Application No. 2015210708 filed Dec. 11, 2019, 18 pages.
Office Action dated Oct. 31, 2019 for Chinese Patent Application No. 201780007235.5, including English translation, (12 pages).
Notice of Acceptance dated Dec. 16, 2019 for Australian Application No. 2015210708.
Office Action dated Feb. 6, 2020 for Korean Patent Application No. 10-2016-7023727, (2 pages).
Foreign Office Action for Indian Patent Appln. No. 201647026959 dated Apr. 23, 2020.
Extended European Search Report and Written Opinion for EP Patent Appin. No. 20156688.2 dated Apr. 29, 2020.
Foreign Office Action for New Zealand Patent Appln. No. 722904 dated May 8, 2020.
Foreign Office Action for Chinese Patent Appln. No. 201680057391.8 dated Mar. 10, 2020.
Foreign Office Action for Chinese Patent Appln. No. 201680042281.4 dated May 21, 2020 (no translation available).
Foreign Office Action for Chinese Patent Appln. No. 201680057392.2 dated Apr. 14, 2020.
Foreign Notice of Allowance for JP Patent Appln. No. 2018-502353 dated Oct. 9, 2020.
Foreign OA Response for CN Patent Appln. No. 201680042281.4 dated Oct. 19, 2020.

(56) References Cited

OTHER PUBLICATIONS

Foreign Exam Report for AU Patent Appln. No. 2016336546 dated Sep. 21, 2020.
Foreign OA for IL Patent Appln. No. 260064 dated Sep. 21, 2020.
Foreign OA for JP Patent Appln. No. 2018-517428 dated Sep. 29, 2020.
Foreign OA for JP Patent Appln. No. 2018-517279 dated Oct. 2, 2020.
Peng Y. et al., Large Vibration Fiber Scanner with two spring constants, 2011 Proceedings of JSPE Semestrial Meeting, Japan, Sep. 5, 2011, pp. 990-991 (a document showing a well-known technique).
1st Examination Report for AU Patent Appln. No. 2017209171 dated Oct. 20, 2020.
Foreign OA Response for IN Patent Appln. No. 201647026959 dated Oct. 21, 2020.
1st Patent Exam Report for NZ Patent Appln. No. 741832 dated Nov. 9, 2020.
Foreign OA for CN Patent Appln. No. 201680057392.2 dated Oct. 19, 2020.
Foreign OA for CN Patent Application No. 201680057391.8 dated Nov. 2, 2020.
Foreign Rejection Deciscion for CN Patent Appln. No. 201780007235.5 dated Nov. 13, 2020.
Foreign OA for JP Patent Application No. 2018-537615 dated Nov. 27, 2020.
Foreign OA Response for JP Patent Application No. 2019-65723 dated Dec. 16, 2020.
Foreign Exam Report for AU Patent Appln. No. 2016333970 dated Dec. 17, 2020.
Foreign OA Response for JP Patent Appln. No. 2018-517279 dated Dec. 22, 2020.
Foreign Response for IL Patent Appln. No. 246995 dated Sep. 24, 2020.
Extended European Search Report for EP Patent Appln. No. 20173220.3 dated Jun. 18, 2020.
Foreign Office Action for Chinese Patent Appln. No. 201680057391.8 dated Jul. 17, 2020.
Foreign Office Action for Chinese Patent Appln. No. 201780007235.5 dated Jul. 14, 2020.
Foreign Office Action Response for Chinese Patent Appln. No. 201680057392.2 dated Aug. 28, 2020 (no translation available).
1st Examination Report for EP Patent Appln. No. 16854353.6 dated Aug. 28, 2020.
Foreign Notice of Allowance for CA Patent Appln. No. 2938262 dated Aug. 5, 2020.
Second Office Action for CN Patent Appln. No. 201680042281.4 dated Aug. 4, 2020.
Amendment Response to FOA for U.S. Appl. No. 16/391,577 dated Sep. 21, 2020.
Foreign OA Response for CN Patent Appln. No. 201780007235.5 dated Sep. 23, 2020.
Foreign OA Response for JP Patent Appln. No. 2018-502353 dated Sep. 24, 2020.
Non-Final Office Action for U.S. Appl. No. 16/373,227 dated Jul. 7, 2020.
Amendment Response to NFOA for U.S. Appl. No. 16/373,227 filed Oct. 7, 2020.
Notice of Allowance for U.S. Appl. No. 16/391,577 dated Oct. 7, 2020.
Non-Final Office Action for U.S. Appl. No. dated Oct. 7, 2020.
Response to Non-Final Office Action for U.S. Appl. No. 16/737,789, filed Jan. 5, 2021.
Foreign Notice of Allowance for IL Patent Appln. No. 260064 dated Jan. 20, 2021.
Foreign Response for NZ Patent Appln. No. 739170 dated Feb. 3, 2021.
Foreign Exam Report for NZ Patent Appln. No. 739170 dated Feb. 9, 2021.
Foreign Response for CN Patent Appln. No. 201780007235.5 dated Feb. 25, 2021.
Foreign Response for JP Patent Appln. No. 2018-537615 dated Feb. 24, 2021.
Foreign Exam Report for IN Patent Appln. No. 201847000653 dated Feb. 26, 2021.
Foreign Exam Report for IN Patent Appln. No. 201847031358 dated Feb. 15, 2021.
Foreign Response for IN Patent Appln. No. 201847031358 dated Feb. 23, 2021.
Foreign OA for CN Patent Appl. No. 201680057392.2 dated Feb. 3, 2021.
Foreign Response for AU Patent Application No. 2019280001 dated Dec. 23 2020.
Foreign Response for CN Patent Appln. No. 201680057392.2 dated Dec. 25, 2020.
Foreign Response for CN Patent Appln. No. 201680057391.8 dated Jan. 5, 2021.
Foreign OA Response for IL Patent Appln. No. 260064 dated Jan. 13, 2021.
Foreign Exam Report for IN Patent Appln. No. 201847014197 dated Jan. 21, 2021.
Foreign Response for AU Patent Appln. No. 2016296723 dated Jan. 21, 2021.
Foreign Response for JP Patent Appln. No. 2018-517428 dated Dec. 24, 2020.
Foreign NOA for CN Patent Appln. No. 201680042281.4 dated Mar. 2, 2021.
Foreign Response for EP Patent Appln. No. 20173220.3 dated Mar. 19, 2021.
Foreign Response for CN Patent Appln. No. 201680057392.2 dated Apr. 16, 2021.
Foreign Exam Report for NZ Patent Appln. No. 741830 dated Feb. 24, 2021.

* cited by examiner

MICROLENS COLLIMATOR FOR SCANNING OPTICAL FIBER IN VIRTUAL/AUGMENTED REALITY SYSTEM

CROSS-REFERENCE TO RELATED APPLICATION

This application claims priority to U.S. Provisional Application Ser. No. 62/237,189, filed on Oct. 5, 2015 entitled "MICROLENS COLLIMATOR FOR SCANNING OPTICAL FIBER IN VIRTUAL/AUGMENTED REALITY SYSTEM." The content of the aforementioned patent application is hereby expressly incorporated by reference in its entirety for all purposes as though set forth in full.

FIELD OF THE INVENTION

The present invention generally relates to systems and methods configured to facilitate interactive virtual or augmented reality environments for one or more users.

BACKGROUND

Modern computing and display technologies have facilitated the development of systems for so-called "virtual reality" or "augmented reality" experiences, wherein digitally reproduced images or portions thereof are presented to a user in a manner where they seem to be, or may be perceived as, real. A virtual reality (VR) scenario typically involves presentation of digital or virtual image information without transparency to other actual real-world visual input, whereas an augmented reality (AR) scenario typically involves presentation of digital or virtual image information as an augmentation to visualization of the actual world around the end user.

For example, referring to FIG. 1, an augmented reality scene 4 is depicted wherein a user of an AR technology sees a real-world park-like setting 6 featuring people, trees, buildings in the background, and a concrete platform 8. In addition to these items, the end user of the AR technology also perceives that he "sees" a robot statue 10 standing upon the real-world platform 8, and a cartoon-like avatar character 12 flying by which seems to be a personification of a bumble bee, even though these elements 10, 12 do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

VR and AR systems typically employ head-worn displays (or helmet-mounted displays, or smart glasses) that are at least loosely coupled to a user's head, and thus move when the end user's head moves. If the end user's head motions are detected by the display system, the data being displayed can be updated to take the change in head pose (i.e., the orientation and/or location of user's head) into account.

As an example, if a user wearing a head-worn display views a virtual representation of a three-dimensional (3D) object on the display and walks around the area where the 3D object appears, that 3D object can be re-rendered for each viewpoint, giving the end user the perception that he or she is walking around an object that occupies real space. If the head-worn display is used to present multiple objects within a virtual space (for instance, a rich virtual world), measurements of head pose can be used to re-render the scene to match the end user's dynamically changing head location and orientation and provide an increased sense of immersion in the virtual space.

Head-worn displays that enable AR (i.e., the concurrent viewing of real and virtual elements) can have several different types of configurations. In one such configuration, often referred to as a "video see-through" display, a camera captures elements of a real scene, a computing system superimposes virtual elements onto the captured real scene, and a non-transparent display presents the composite image to the eyes. Another configuration is often referred to as an "optical see-through" display, in which the end user can see through transparent (or semi-transparent) elements in the display system to view directly the light from real objects in the environment. The transparent element, often referred to as a "combiner," superimposes light from the display over the end user's view of the real world.

VR and AR systems typically employ a display system having a projection subsystem and a display surface positioned in front of the end user's field of view and on which the projection subsystem sequentially projects image frames. In true three-dimensional systems, the depth of the display surface can be controlled at frame rates or sub-frame rates. The projection subsystem may include one or more optical fibers into which light from one or more light sources emit light of different colors in defined patterns, and a scanning device that scans the optical fiber(s) in a predetermined pattern to create the image frames that sequentially displayed to the end user.

In one embodiment, the display system includes one or more planar waveguides that are generally parallel to the field of view of the user, and into which light from the optical fiber(s) is injected. One or more linear diffraction gratings are embedded within the waveguide(s) to change the angle of incident light propagating along the waveguide(s). By changing the angle of light beyond the threshold of total internal reflection (TIR), the light escapes from one or more lateral faces of the waveguide(s). The linear diffraction grating(s) have a low diffraction efficiency, so only a fraction of the light energy is directed out of the waveguide(s), each time the light encounters the linear diffraction grating(s). By outcoupling the light at multiple locations along the grating(s), the exit pupil of the display system is effectively increased. The display system may further comprise one or more collimation elements that collimate light coming from the optical fiber(s), and one or more optical coupling elements that optically couple the collimated light to, or from, an edge of the waveguide(s).

In a typical optical fiber scanning display system, each optical fiber acts as a vibrating cantilever that sweeps through relatively large deflections from a fulcrum in order to scan the light in accordance with a designed scan pattern.

For example, with reference to FIG. 2, one embodiment of a display system 20 comprises one or more light sources 22 that generate image data that is encoded in the form of light that is spatially and/or temporally varying, an optical fiber 24 optically coupled to the light source(s) 22, and a collimation element 26 that collimates the light exiting the distal end of the optical fiber 24. The display system 20 further comprises a piezoelectric element 28 to or in which the optical fiber 24 is mounted as a fixed-free flexible cantilever, and drive electronics 30 electrically coupled to the piezoelectric element 22 to activate electrically stimulate the piezoelectric element 28, thereby causing the distal end of the optical fiber 24 to vibrate in a pre-determined scan pattern that creates deflections 32 about a fulcrum 34.

The display system 20 includes a waveguide apparatus 38 that includes a plurality of planar waveguides 40a-40e that are generally parallel to the field-of-view of the end user, and one or more diffractive optical elements (DOEs) 42a-42e associated with each of the planar waveguides 40. Light originating from the optical fiber 24 propagates along selected ones of the planar waveguides 40 and intersects with the corresponding DOEs 42, causing a portion of the light to exit the face of the waveguide apparatus 38 towards the eyes of the end user that is focused at one or more viewing distances depending on the selected planar waveguide(s) 40.

The display system 20 further comprises optical coupling elements in the form of diffractive optical elements (DOEs) 44a-44e that are integrated within the ends of the respective planar waveguides 40a-40e and that reflect the collimate light into selected ones of the planar waveguides 40. As can be seen, as the distance between each DOE 44 and the end of the optical fiber 24 increases, the length of the respective DOE 44 must increase in order to accommodate the increasing linear span of the deflection angle of the optical fiber 24. This necessarily adds size and complexity to the waveguide apparatus 38 due to the largest DOE 44, and in this case, the DOE 44e.

As another example, with reference to FIG. 3, another embodiment of a display system 50 is similar to the display system 10 of FIG. 2, with the exception that the display system 50 comprises an optical coupling element in the form of an optical distribution waveguide 52 that have DOEs 54a-54e that reflect the collimate light into selected ones of the planar waveguides 40. The width of the distribution waveguide 52 must be large enough to accommodate the maximum linear span of the deflection angle of the optical fiber 24, thereby necessarily adding size and complexity to the waveguide apparatus 38.

In both embodiments described above, the design of the collimation element 26, which is fixed in contrast to the moving optical fiber 24, tends to be complex due to the constraints imposed by the moving optical fiber 24 (lateral deflection, radius of sweep/curvature, and tip angle). In particular, the collimation element 26 is composed of a relatively large stack of lenses in order to accommodate different positions and angles of optical fiber tip. Of particular note, the tip of the optical fiber 24 tends to exhibit a whipping action as it scans back and forth, which although advantageously increasing the scan angle to increase the field of view, disadvantageously causes the angle of the optical fiber tip to diverge from its nominal perpendicular orientation relative to the scan curvature of the optical fiber 24. This adds even more constraints to the design of the collimation element 26. For example, a typical collimation element 26 with this architecture may be composed of a fourteen lens stack that is 40 mm long.

There, thus, is a need to reduce the size and complexity of a collimation element in a virtual reality or augmented reality environment, while preserving or even enhancing the whipping action of the optical fiber.

SUMMARY

Embodiments of the present invention are directed to devices, systems and methods for facilitating virtual reality and/or augmented reality interaction for one or more users.

In accordance with the present inventions, a display subsystem for a virtual image generation system for use by an end user is provided. The virtual image generation system may, e.g., comprise memory storing a three-dimensional scene, and a control subsystem configured for rendering a plurality of synthetic image frames of the three-dimensional scene, in which case, the display subsystem may be configured for sequentially displaying the plurality of image frames to the end user.

The display subsystem comprises a planar waveguide apparatus. In one embodiment, the planar waveguide apparatus is configured for being positioned in front of the eyes of the end user. The planar waveguide apparatus may have a partially transparent display surface configured for being positioned in the field of view between the eyes of the end user and an ambient environment. In one embodiment, the display subsystem may further comprise a frame structure configured for being worn by the end user, in which case, the frame structure may carry the planar waveguide apparatus.

The display subsystem further comprises an optical fiber, at least one light source configured for emitting light from a distal end of the optical fiber, and a collimation element (e.g., a single lens such as a microlens) mounted to a distal end of the optical fiber for collimating light from the optical fiber. The display subsystem further comprises a mechanical drive assembly to which the optical fiber is mounted (e.g., as a fixed-free flexible cantilever). The mechanical drive assembly is configured for displacing the distal end of the optical fiber, along with the collimation element, in accordance with a scan pattern. In one embodiment, the outputted light diverges from a longitudinal axis coincident with the fulcrum. The mechanical drive assembly may comprise a piezoelectric element to which the optical fiber is mounted, and drive electronics configured for conveying electrical signals to the piezoelectric element, thereby causing the optical fiber to vibrate in accordance with the scan pattern. The optical fiber may be vibrated in a first order vibration mode, or even a higher (e.g., second) order vibration mode.

The display subsystem further comprises an optical waveguide input apparatus configured for directing the collimated light from the collimation element down the planar waveguide apparatus, such that the planar waveguide apparatus displays one or more image frames to the end user. In one embodiment, the planar waveguide apparatus comprises a plurality of planar waveguides configured for respectively displaying the image frame(s) at different focal points to the end user, in which case, the optical waveguide input apparatus may be configured for directing the light down selected ones of the plurality of planar waveguides. In another embodiment, the optical waveguide input apparatus comprises a plurality of diffractive optical elements respectively extending parallel along the planar waveguides, and respectively directing the light from the optical modulation apparatus down the planar waveguides. In still another embodiment, the optical waveguide input apparatus comprises a distribution waveguide extending perpendicularly to the planar waveguides, and the distribution waveguide comprises a plurality of diffractive optical elements that respectively direct the light from the optical modulation apparatus down the planar waveguides.

Additional and other objects, features, and advantages of the invention are described in the detail description, figures and claims.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings.

Understanding that these drawings depict only typical embodiments of the invention and are not therefore to be considered limiting of its scope, the invention will be described and explained with additional specificity and detail through the use of the accompanying drawings in which.

DETAILED DESCRIPTION

The description that follows relates to display systems and methods to be used in virtual reality and/or augmented reality systems. However, it is to be understood that the while the invention lends itself well to applications in virtual or augmented reality systems, the invention, in its broadest aspects, may not be so limited.

Figure 1:
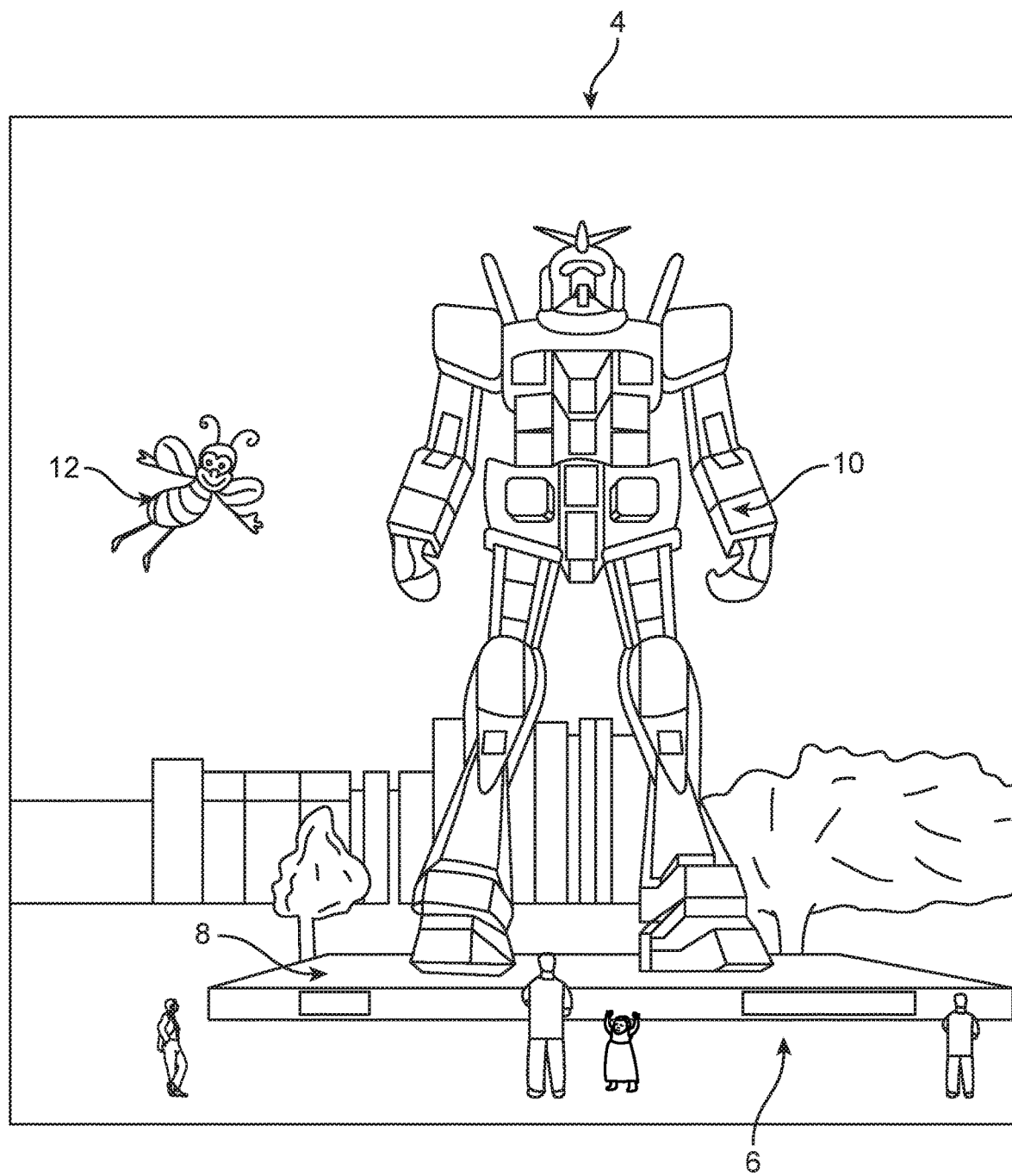
FIG. 1 is a picture of a three-dimensional augmented reality scene that can be displayed to an end user by a prior art augmented reality generation device.
Figure 2:
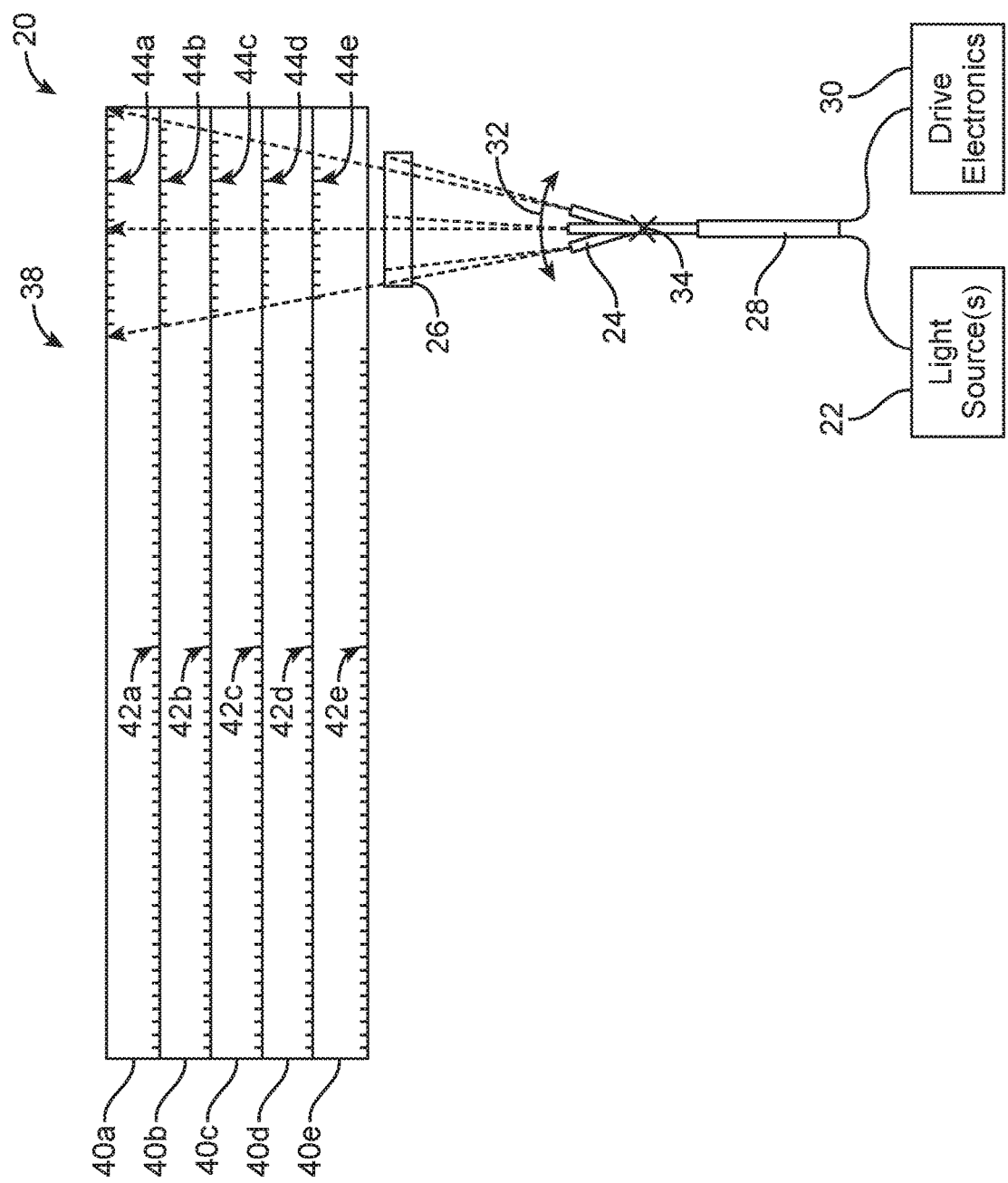
FIG. 2 is a plan view of one embodiment of a prior art display system that can be used in an augmented reality generation device.
Figure 3:
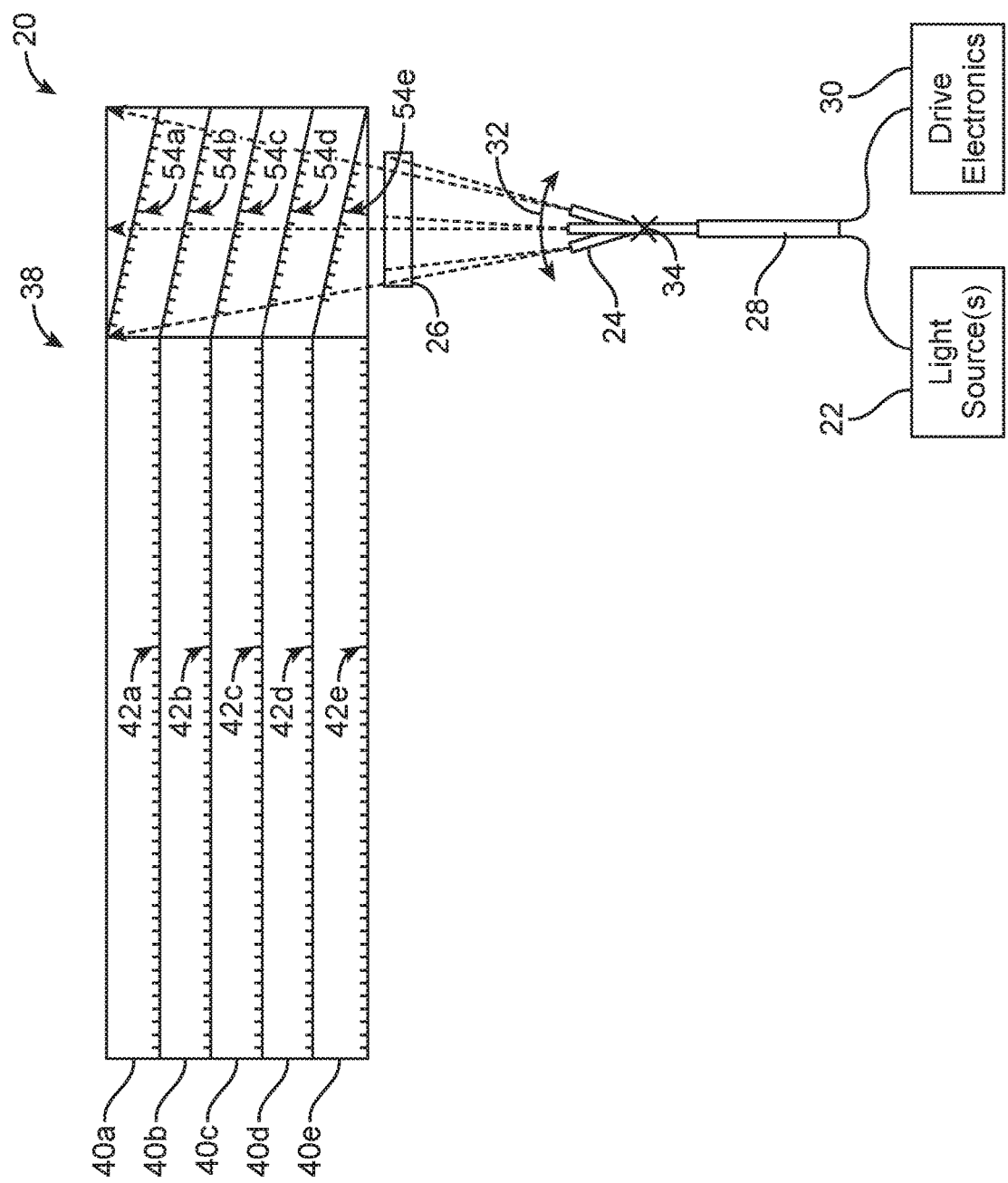
FIG. 3 is a plan view of another embodiment of a prior art display system that can be used in an augmented reality generation device.
Figure 4:
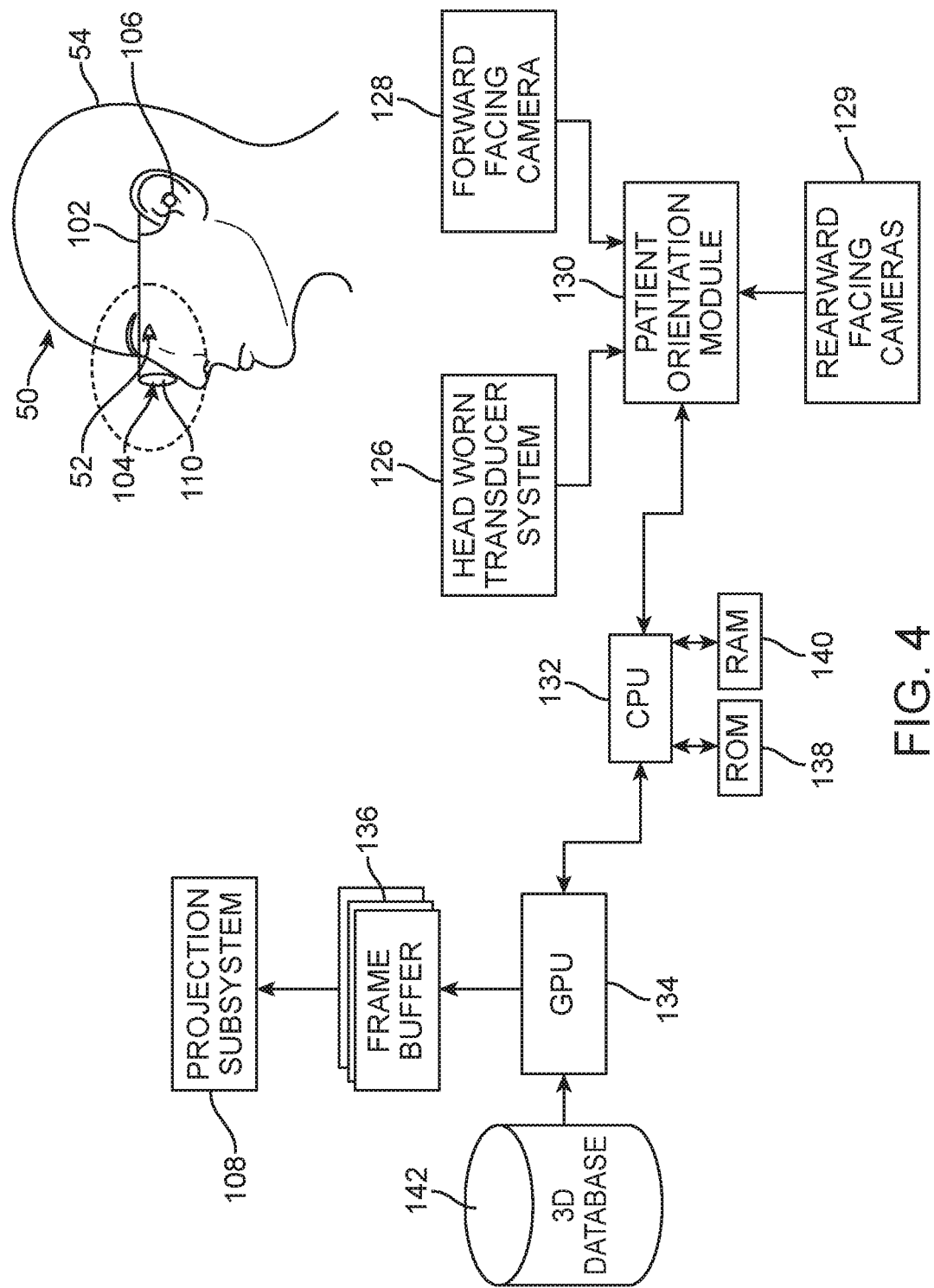
FIG. 4 is a block diagram of a virtual image generation system constructed in accordance with one embodiment of the present inventions.

Referring to FIG. 4, one embodiment of a virtual image generation system 100 constructed in accordance with present inventions will now be described. The virtual image generation system 100 may be operated as an augmented reality subsystem, providing images of virtual objects inter-mixed with physical objects in a field of view of an end user 50. There are two fundamental approaches when operating the virtual image generation system 100. A first approach employs one or more imagers (e.g., cameras) to capture images of the ambient environment. The virtual image generation system 100 inter-mixes the virtual images into the data representing the images of the ambient environment. A second approach employs one or more at least partially transparent surfaces through which the ambient environment can be seen and on to which the virtual image generation system 100 produces images of virtual objects.

The virtual image generation system 100, and the various techniques taught herein, may be employed in applications other than augmented reality and virtual reality subsystems. For example, various techniques may be applied to any projection or display subsystem, or may be applied to pico projectors where movement may be made by an end user's hand rather than the head. Thus, while often described herein in terms of an augmented reality subsystem or virtual reality subsystem, the teachings should not be limited to such subsystems of such uses.

At least for augmented reality applications, it may be desirable to spatially position various virtual objects relative to respective physical objects in a field of view of the end user 50. Virtual objects, also referred to herein as virtual tags or tag or call outs, may take any of a large variety of forms, basically any variety of data, information, concept, or logical construct capable of being represented as an image. Non-limiting examples of virtual objects may include: a virtual text object, a virtual numeric object, a virtual alpha-numeric object, a virtual tag object, a virtual field object, a virtual chart object, a virtual map object, a virtual instrumentation object, or a virtual visual representation of a physical object.

To this end, the virtual image generation system 100 comprises a frame structure 102 worn by an end user 50, a display subsystem 104 carried by the frame structure 102, such that the display subsystem 104 is positioned in front of the eyes 52 of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 104 is designed to present the eyes 52 of the end user 50 with photo-based radiation patterns that can be comfortably perceived as augmentations to physical reality, with high-levels of image quality and three-dimensional perception, as well as being capable of presenting two-dimensional content. The display subsystem 104 presents a sequence of synthetic image frames at high frequency that provides the perception of a single coherent scene.

The display subsystem 104 comprises a projection subsystem 108 and a partially transparent display screen 110 on which the projection subsystem 108 projects images. The display screen 110 is positioned in the end user's 50 field of view between the eyes 52 of the end user 50 and an ambient environment.

In the illustrated embodiment, the projection subsystem 108 takes the form of an optical fiber scan-based projection device, and the display screen 110 takes the form of a waveguide-based display into which the scanned light from the projection subsystem 108 is injected to produce, e.g., images at single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem 104 may be monocular or binocular.

Figure 5:
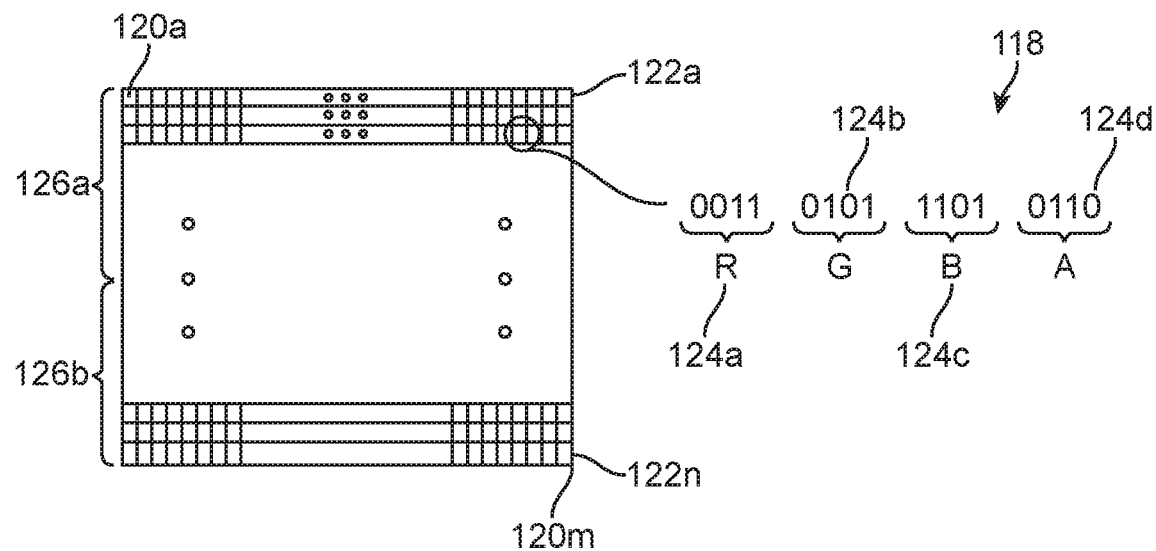
FIG. 5 is a plan view of an exemplary frame generated by the virtual image generation system of FIG. 4.

Thus, the display subsystem 104 generates a series of synthetic image frames of pixel information that present an image of one or more virtual objects to the user. For example, referring to FIG. 5, a synthetic image frame 118 is schematically illustrated with cells 120a-120m divided into horizontal rows or lines 122a-122n. Each cell 120 of the frame 118 may specify values for each of a plurality of colors for the respective pixel to which the cell 120 corresponds and/or intensities. For instance, the frame 118 may specify one or more values for red 124a, one or more values for green 124b, and one or more values for blue 124c for each pixel. The values 124 may be specified as binary representations for each of the colors, for instance, a respective 4-bit number for each color. Each cell 120 of the frame 118 may additionally include a value 124d that specifies an amplitude.

The frame 118 may include one or more fields, collectively 126. The frame 118 may consist of a single field. Alternatively, the frame 118 may comprise two, or even more fields 126a-126b. The pixel information for a complete first field 126a of the frame 118 may be specified before the pixel information for the complete second field 126b, for example occurring before the pixel information for the second field 126b in an array, an ordered list or other data structure (e.g., record, linked list). A third or even a fourth field may follow the second field 126b, assuming a presentation subsystem is configured to handle more than two fields 126a-126b.

Figure 6:
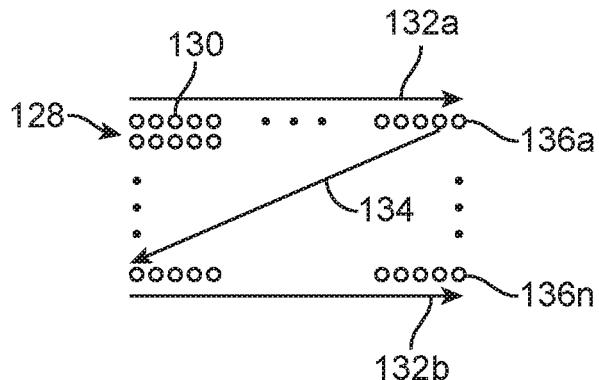
FIG. 6 is a plan view of one scanning pattern that can be used to generate a frame.

Referring now to FIG. 6, the frame 118 is generated using a raster scan pattern 128. In the raster scan pattern 128, pixels 130 (only one called out) are sequentially presented. The raster scan pattern 128 typically presents pixels from left to right (indicated by arrows 132a, 132b, then from top to bottom (indicated by arrow 134). Thus, the presentation may start at the upper right corner and traverse left across a first line 136a until the end of the line is reached. The raster scan pattern 128 typically then starts from the left in a next line down. The presentation may be temporarily blacked out or blanked when returning from the end of one line to the start of the next line. This process repeats line-by-line until the bottom line 136n is completed, for example at the bottom right most pixel. With the frame 118 being complete, a new frame is started, again returning the right of the top most line of the next frame. Again, the presentation may be blanked while returning from the bottom left to the top right to present the next frame.

Many implementations of raster scanning employ what is termed as an interlaced scan pattern. In interlaced raster scan patterns, lines from the first and the second fields 126a, 126b are interlaced. For example, when presenting lines of the first field 126a, the pixel information for the first field 126a may be used for the odd numbered lines only, while the pixel information for the second field 126b may be used for the even numbered lines only. Thus, all of the lines of the first field 126a of the frame 118 (FIG. 5) are typically presented before the lines of the second field 126b. The first field 126a may be presented using the pixel information of the first field 126a to sequentially present line 1, line 3, line 5, etc. Then the second field 126b of the frame 118 (FIG. 5) may be presented following the first field 126a, by using the pixel information of the second field 126b to sequentially present line 2, line 4, line 6, etc.

Figure 7:
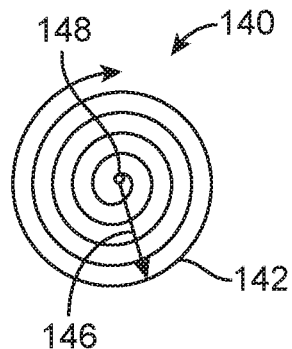
FIG. 7 is a plan view of another scanning pattern that can be used to generate a frame.

Referring to FIG. 7, a spiral scan pattern 140 may be used instead of the raster scan pattern 128 to generate the frame 118. The spiral scan pattern 140 may consist of a single spiral scan line 142, which may include one or more complete angular cycles (e.g., 360 degrees) which may be denominated as coils or loops. As with the raster scan pattern 128 illustrated in FIG. 6, the pixel information in the spiral scan pattern 140 is used to specify the color and/or intensity of each sequential pixel, as the angle increments. An amplitude or radial value 146 specifies a radial dimension from a starting point 148 of the spiral scan line 142.

Figure 8:
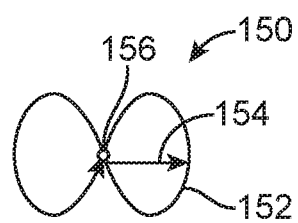
FIG. 8 is a plan view of still another scanning pattern that can be used to generate a frame.

Referring to FIG. 8, a Lissajous scan pattern 150 may alternatively be used to generate the frame 118. The Lissajous scan pattern 150 may consist of a single Lissajous scan line 152, which may include one or more complete angular cycles (e.g., 360 degrees), which may be denominated as coils or loops. Alternatively, the Lissajous scan pattern 150 may include two or more Lissajous scan lines 152, each phase shifted with respect to one another to nest the Lissajous scan lines 152. The pixel information is used to specify the color and/or intensity of each sequential pixel, as the angle increments. An amplitude or radial value specifies a radial dimension 154 from a starting point 156 of the Lissajous scan line 152.

Figure 9:
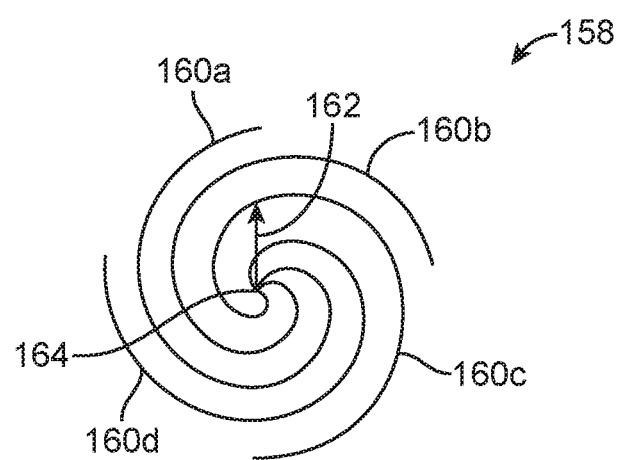
FIG. 9 is a plan view of yet another scanning pattern that can be used to generate a frame.

Referring to FIG. 9, a multi-field spiral scan pattern 158 may alternatively be used to generate the frame 118. The multi-field spiral scan pattern 158 includes two or more distinct spiral scan lines, collectively 160, and in specifically, four spiral scan lines 160a-160d. The pixel information for each spiral scan line 160 may be specified by a respective field of a frame. Advantageously, multiple spiral scan lines 160 may be nested simply by shifting a phase between each successive ones of the spiral scan lines 160. The phase difference between spiral scan lines 160 should be a function of the total number of spiral scan lines 160 that will be employed. For example, four spiral scan lines 160a-160d may be separated by a 90 degree phase shift. An exemplary embodiment may operate at a 100 Hz refresh rate with 10 distinct spiral scan lines (i.e., subspirals). Similar to the embodiment of FIG. 7, one or more amplitude or radial values specify a radial dimension 162 from a starting point 164 of the spiral scan lines 160.

Further details describing display subsystems are provided in U.S. Provisional Patent Application Ser. No. 61/801,219, entitled "Display Subsystem and Method", and U.S. Provisional Patent Application Ser. No. 61/845,907, entitled "Planar Waveguide Apparatus With Diffraction Element(s) and Subsystem Employing Same", which are expressly incorporated herein by reference.

Referring back to FIG. 4, the virtual image generation system 100 further comprises one or more sensors (not shown) mounted to the frame structure 102 for detecting the position and movement of the head 54 of the end user 50 and/or the eye position and inter-ocular distance of the end user 50. Such sensor(s) may include image capture devices (such as cameras), microphones, inertial measurement units, accelerometers, compasses, GPS units, radio devices, and/or gyros).

For example, in one embodiment, the virtual image generation system 100 comprises a head worn transducer subsystem 126 that includes one or more inertial transducers to capture inertial measures indicative of movement of the head 54 of the end user 50. Such may be used to sense, measure, or collect information about the head movements of the end user 50. For instance, such may be used to detect measurement movements, speeds, acceleration, and/or positions of the head 54 of the end user 50.

The virtual image generation system 100 further comprises one or more forward facing cameras 128, which may be used to capture information about the environment in which the end user 50 is located. The forward facing camera(s) 128 may be used to capture information indicative of distance and orientation of the end user 50 with respect to that environment and specific objects in that environment. When head worn, the forward facing camera(s) 128 is particularly suited to capture information indicative of distance and orientation of the head 54 of the end user 50 with respect to the environment in which the end user 50 is located and specific objects in that environment. The forward facing camera(s) 128 may, for example, be employed to detect head movement, speed, and/or acceleration of head movements. The forward facing camera(s) 128 may, for example, be employed to detect or infer a center of attention of the end user 50, for example, based at least in part on an orientation of the head 54 of the end user 50. Orientation may be detected in any direction (e.g., up/down, left, right with respect to the reference frame of the end user 50).

The virtual image generation system 100 further comprises a pair of rearward facing cameras 129 to track movement, blinking, and depth of focus of the eyes 52 of the end user 50. Such eye tracking information may, for example, be discerned by projecting light at the end user's eyes, and detecting the return or reflection of at least some of that projected light. Further details discussing eye tracking devices are provided in U.S. Patent Application Ser. No. 61/801,219, entitled "Display Subsystem and Method," U.S. Patent Application Ser. No. 62/005,834, entitled "Methods and Subsystem for Creating Focal Planes in Virtual and Augmented Reality," and U.S. Patent Application Ser. No. 61/776,771, entitled "Subsystem and Method for Augmented and Virtual Reality," which are expressly incorporated herein by reference.

The virtual image generation system 100 further comprises a user orientation detection module 130. The patient orientation module 130 detects the instantaneous position of the head 54 of the end user 50 and may predict the position of the head 54 of the end user 50 based on position data received from the sensor(s). Significantly, detecting the instantaneous position of the head 54 of the end user 50 facilitates determination of the specific actual object that the end user 50 is looking at, thereby providing an indication of the specific textual message to be generated for that actual object and further providing an indication of the textual region in which the textual message is to be streamed. The patient orientation module 130 also tracks the eyes 52 of the end user 50 based on the tracking data received from the sensor(s).

The virtual image generation system 100 further comprises a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

In the illustrated embodiment, the virtual image generation system 100 comprises a central processing unit (CPU) 132, a graphics processing unit (GPU) 134, and one or more frame buffers 136. The CPU 132 controls overall operation, while the GPU 134 renders frames (i.e., translating a three-dimensional scene into a two-dimensional image) from three-dimensional data stored in the remote data repository 150 and stores these frames in the frame buffer(s) 136. While not illustrated, one or more additional integrated circuits may control the reading into and/or reading out of frames from the frame buffer(s) 136 and operation of the scanning device of the display subsystem 104. Reading into and/or out of the frame buffer(s) 146 may employ dynamic addressing, for instance, where frames are over-rendered. The virtual image generation system 100 further comprises a read only memory (ROM) 138 and a random access memory (RAM) 140. The virtual image generation system 100 further comprises a three-dimensional data base 142 from which the GPU 134 can access three-dimensional data of one or more scenes for rendering frames.

Figure 10A:
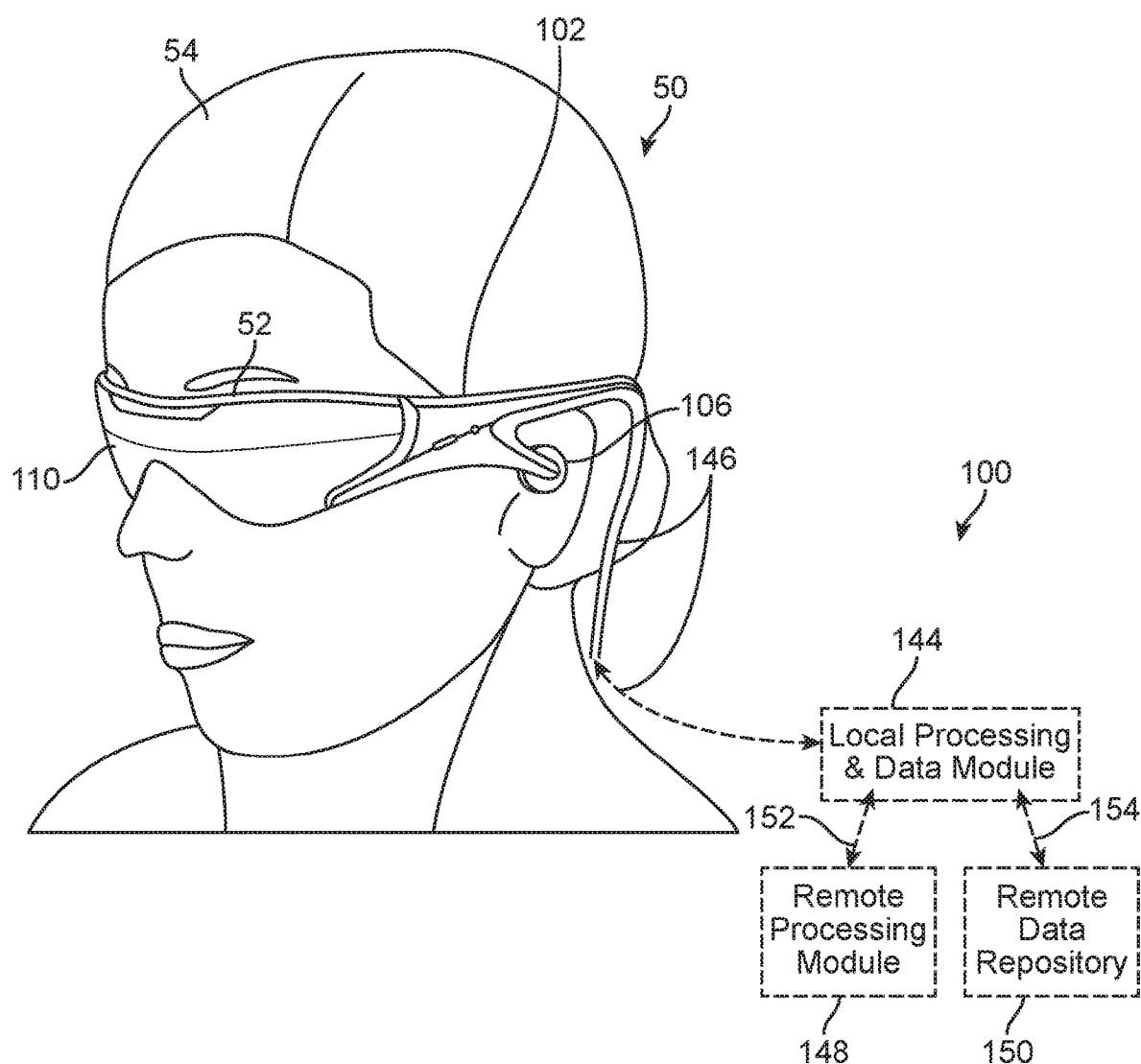
FIG. 10a is a plan view of one technique that can be used to wear the virtual image generation system of FIG. 4.
Figure 10B:
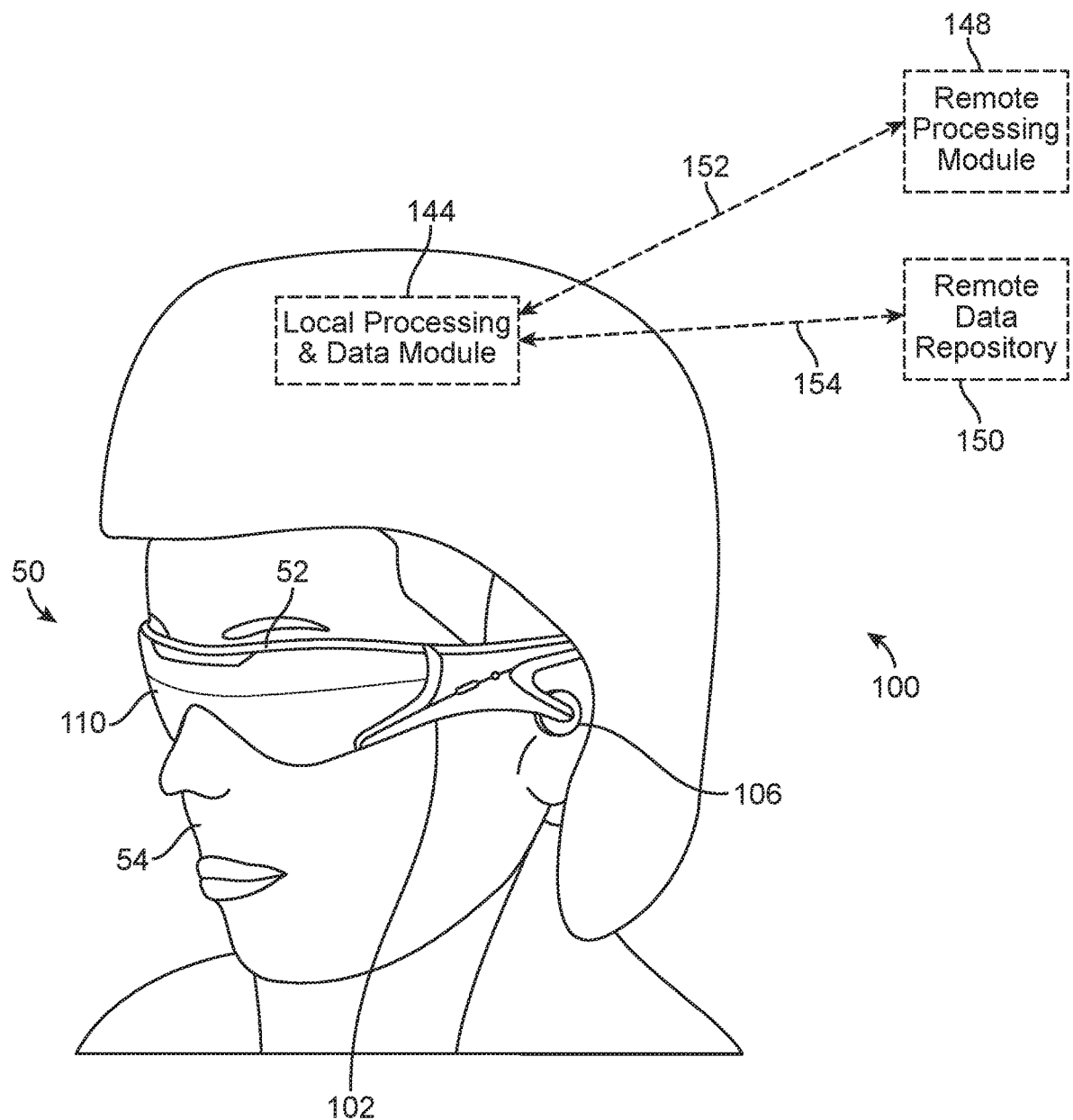
FIG. 10b is a plan view of another technique that can be used to wear the virtual image generation system of FIG. 4.
Figure 10C:
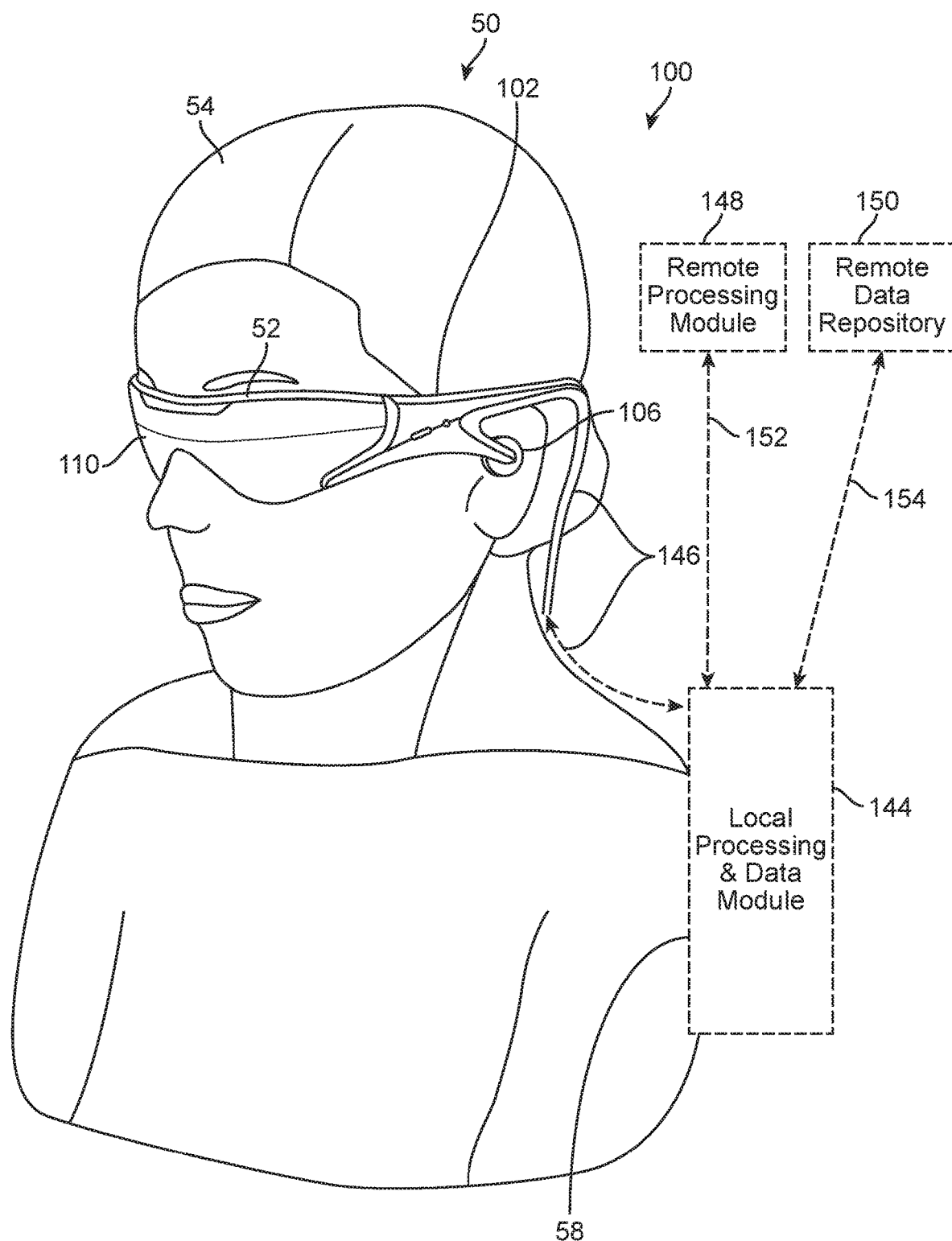
FIG. 10c is a plan view of still another technique that can be used to wear the virtual image generation system of FIG. 4.
Figure 10D:
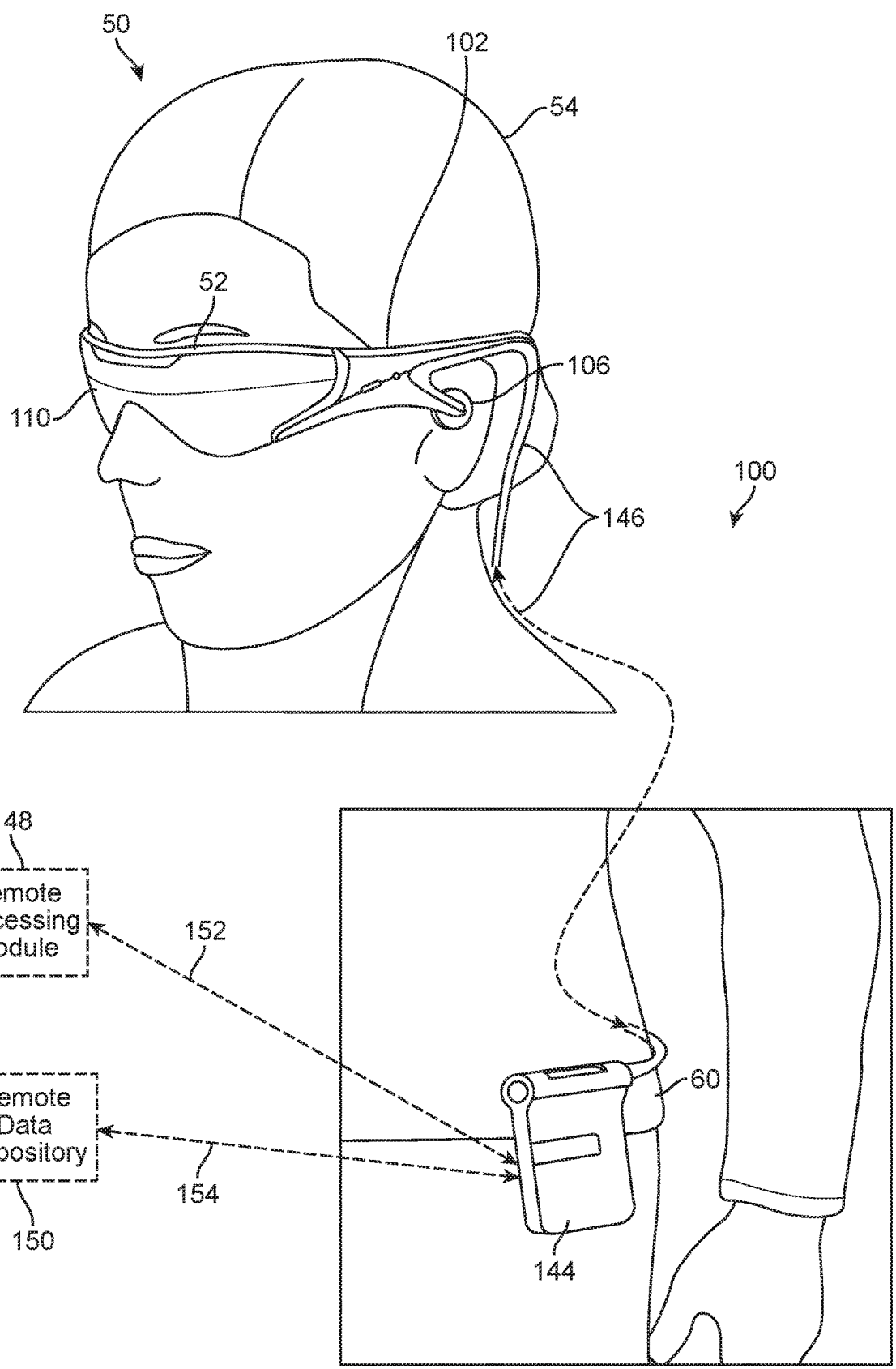
FIG. 10d is a plan view of yet another technique that can be used to wear the virtual image generation system of FIG. 4.

The various processing components of the virtual image generation system 100 may be physically contained in a distributed subsystem. For example, as illustrated in FIGS. 10a-10d, the virtual image generation system 100 comprises a local processing and data module 144 operatively coupled, such as by a wired lead or wireless connectivity 146, to the display subsystem 104 and sensors. The local processing and data module 144 may be mounted in a variety of configurations, such as fixedly attached to the frame structure 102 (FIG. 10a), fixedly attached to a helmet or hat 56 (FIG. 10b), embedded in headphones, removably attached to the torso 58 of the end user 50 (FIG. 10c), or removably attached to the hip 60 of the end user 50 in a belt-coupling style configuration (FIG. 10d). The virtual image generation system 100 further comprises a remote processing module 148 and remote data repository 150 operatively coupled, such as by a wired lead or wireless connectivity 150, 152, to the local processing and data module 144, such that these remote modules 148, 150 are operatively coupled to each other and available as resources to the local processing and data module 144.

The local processing and data module 144 may comprise a power-efficient processor or controller, as well as digital memory, such as flash memory, both of which may be utilized to assist in the processing, caching, and storage of data captured from the sensors and/or acquired and/or processed using the remote processing module 148 and/or remote data repository 150, possibly for passage to the display subsystem 104 after such processing or retrieval. The remote processing module 148 may comprise one or more relatively powerful processors or controllers configured to analyze and process data and/or image information. The remote data repository 150 may comprise a relatively large-scale digital data storage facility, which may be available through the internet or other networking configuration in a "cloud" resource configuration. In one embodiment, all data is stored and all computation is performed in the local processing and data module 144, allowing fully autonomous use from any remote modules.

The couplings 146, 152, 154 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 10*a*-10*d*. Thus, the particular choice of wired or wireless communications should not be considered limiting.

In the illustrated embodiment, the patient orientation module 130 is contained in the local processing and data module 144, while CPU 132 and GPU 134 are contained in the remote processing module 148, although in alternative embodiments, the CPU 132, GPU 124, or portions thereof may be contained in the local processing and data module 144. The 3D database 142 can be associated with the remote data repository 150.

Figure 11:
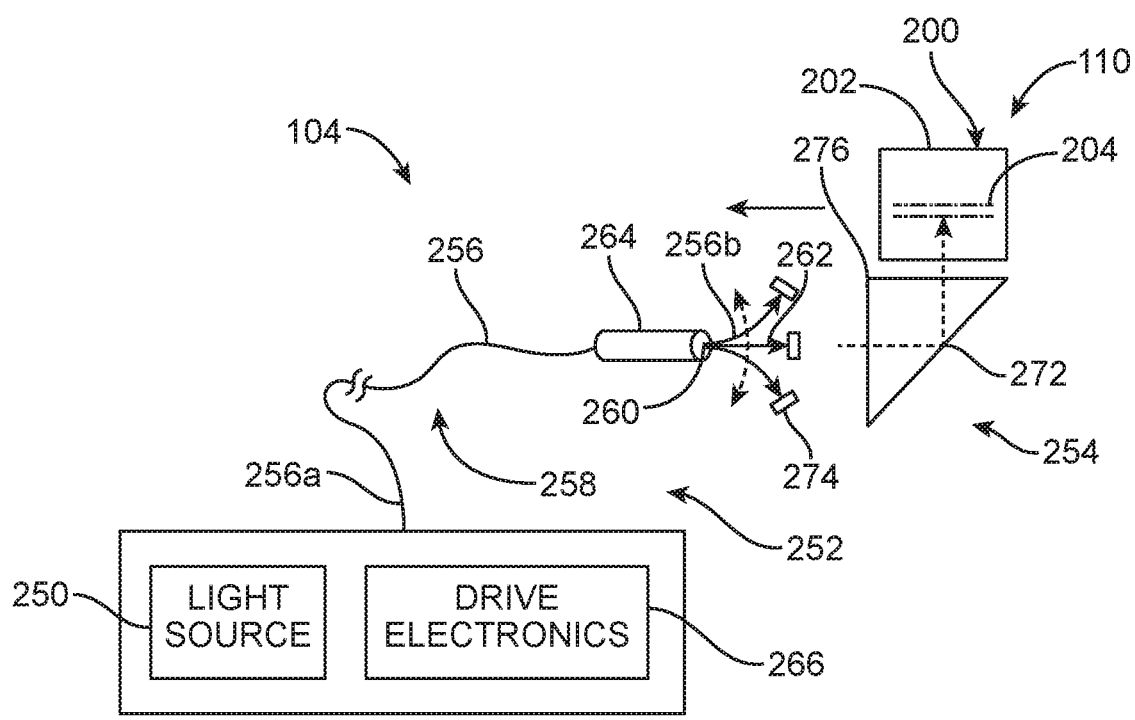
FIG. 11 is a plan view of one embodiment of a display subsystem for use in the virtual image generation system of FIG. 4.
Figure 12:
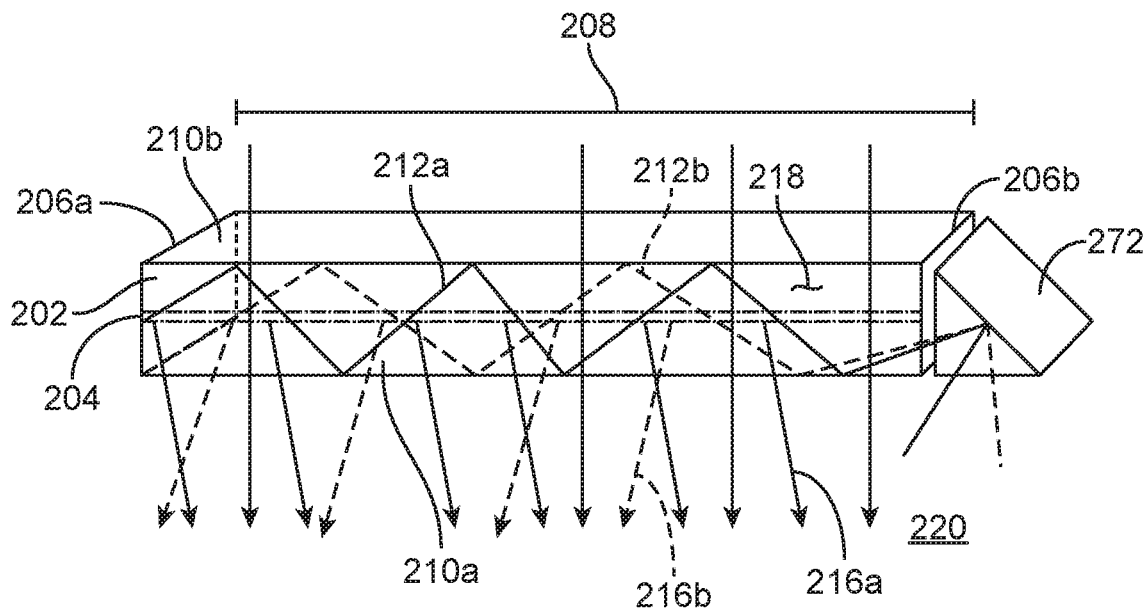
FIG. 12 is one embodiment of a primary planar waveguide for use in the display subsystem of FIG. 11.

Referring now to FIGS. 11 and 12, the display screen 110 comprises a primary waveguide apparatus 200. The primary waveguide apparatus 200 includes one or more primary planar waveguides 202 (only one shown in FIGS. 11 and 12), and one or more diffractive optical elements (DOEs) 204 (only one shown in FIGS. 11 and 12) associated with each of at least some of the primary waveguides 202. As best illustrated in FIG. 12, each primary waveguide 202 has a first end 206*a* and a second end 206*b*, the second end 206*b* opposed to the first end 206*a* along a length 208 of the primary waveguide(s) 202. Each of the primary waveguide(s) 202 has a first face 210*a* and a second face 210*b*, at least the first and the second faces 210*a*, 210*b* (collectively 210) forming an at least partially internally reflective optical path (illustrated by arrow 212*a* and broken line arrow 212*b*, collectively 212) along at least a portion of the length 208 of the primary waveguide(s) 202. The primary waveguide(s) 202 may take a variety of forms that provide for substantially total internal reflection (TIR) for light striking the faces 210 at less than a defined critical angle. Each of the primary waveguide(s) 202 may, for example, take the form of a pane or plane of glass, fused silica, acrylic, or polycarbonate.

The DOEs 204 (illustrated in FIGS. 11 and 12 by dash-dot double lines) may take a large variety of forms which interrupt the TIR optical path 212, providing a plurality of optical paths (illustrated by arrows 214*a* and broken line arrows 214*b*, collectively 214) between an interior 216 and an exterior 218 of the primary waveguide 202 extending along at least a portion of the length 206 of the primary waveguide 202. The DOEs 204 may allow positioning of apparent objects and focus plane for apparent objects. Such may be achieved on a frame-by-frame, subframe-by-subframe, or even pixel-by-pixel basis.

As illustrated in FIG. 12, the light propagates along the primary waveguide(s) 202 with at least some reflections or "bounces" resulting from the TIR propagation. It is noted that some implementations may employ one or more reflectors in the internal optical path, for instance thin-films, dielectric coatings, metalized coatings, etc., which may facilitate reflection. Light propagates along the length 208 of the primary waveguide(s) 202, and intersects with one or more DOEs 204 at various positions along the length 208. The DOE(s) 204 may be incorporated within the primary waveguides 202 or abutting or adjacent one or more of the faces 210 of the primary waveguide(s) 202. The DOE(s) 204 accomplishes at least two functions. The DOE(s) 204 shift an angle of the light, causing a portion of the light to escape TIR, and emerge from the interior 216 to the exterior 218 via one or more faces 210 of the primary waveguide(s) 202. The DOE(s) 204 focus the out-coupled light at one or more viewing distances. Thus, someone looking through a face 210*a* of the primary waveguides 202 can see digital imagery at one or more viewing distances.

Figure 13A:
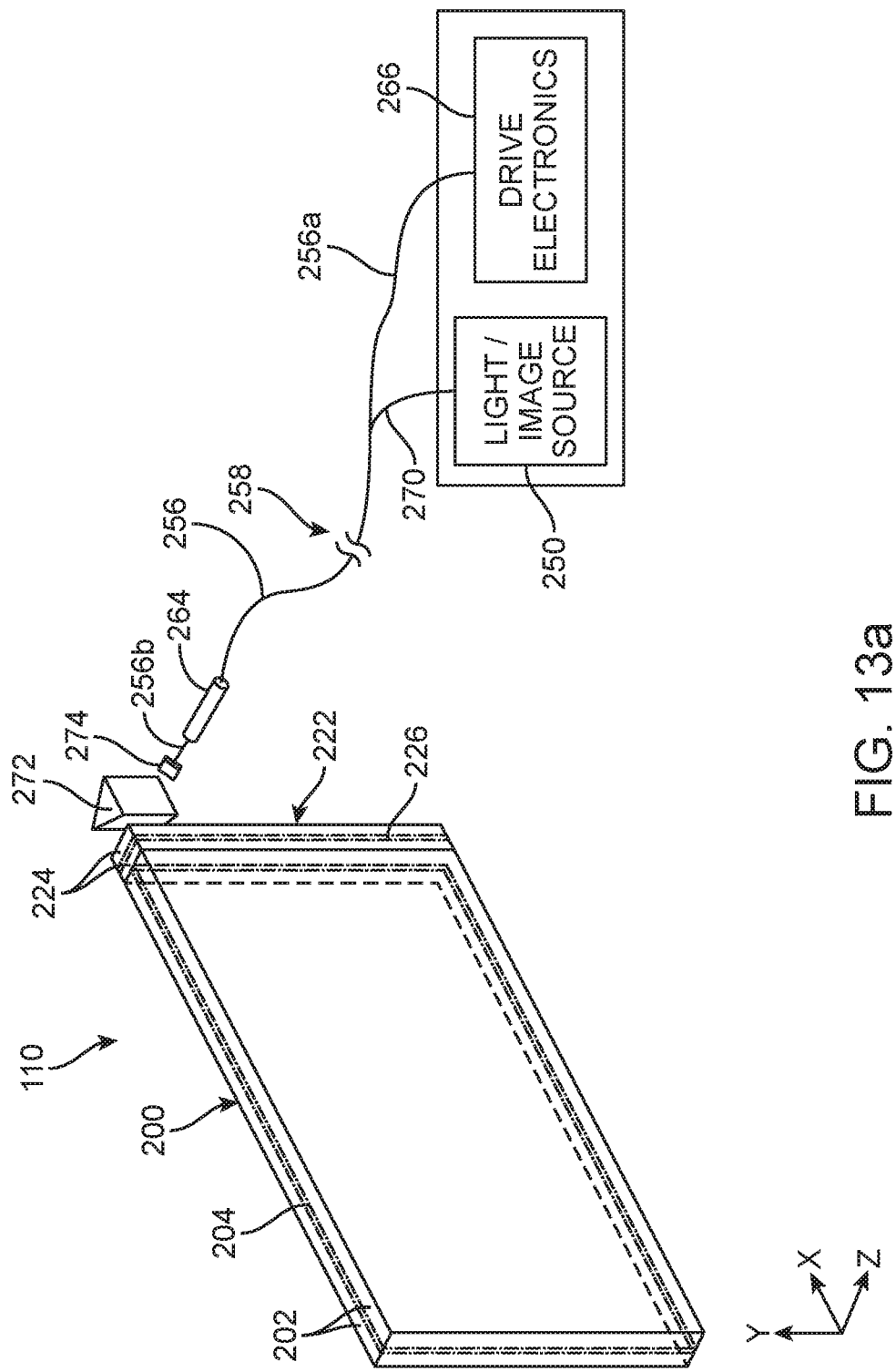
FIG. 13a is perspective view of one embodiment of a display subsystem for use in the virtual image generation system of FIG. 4.
Figure 13B:
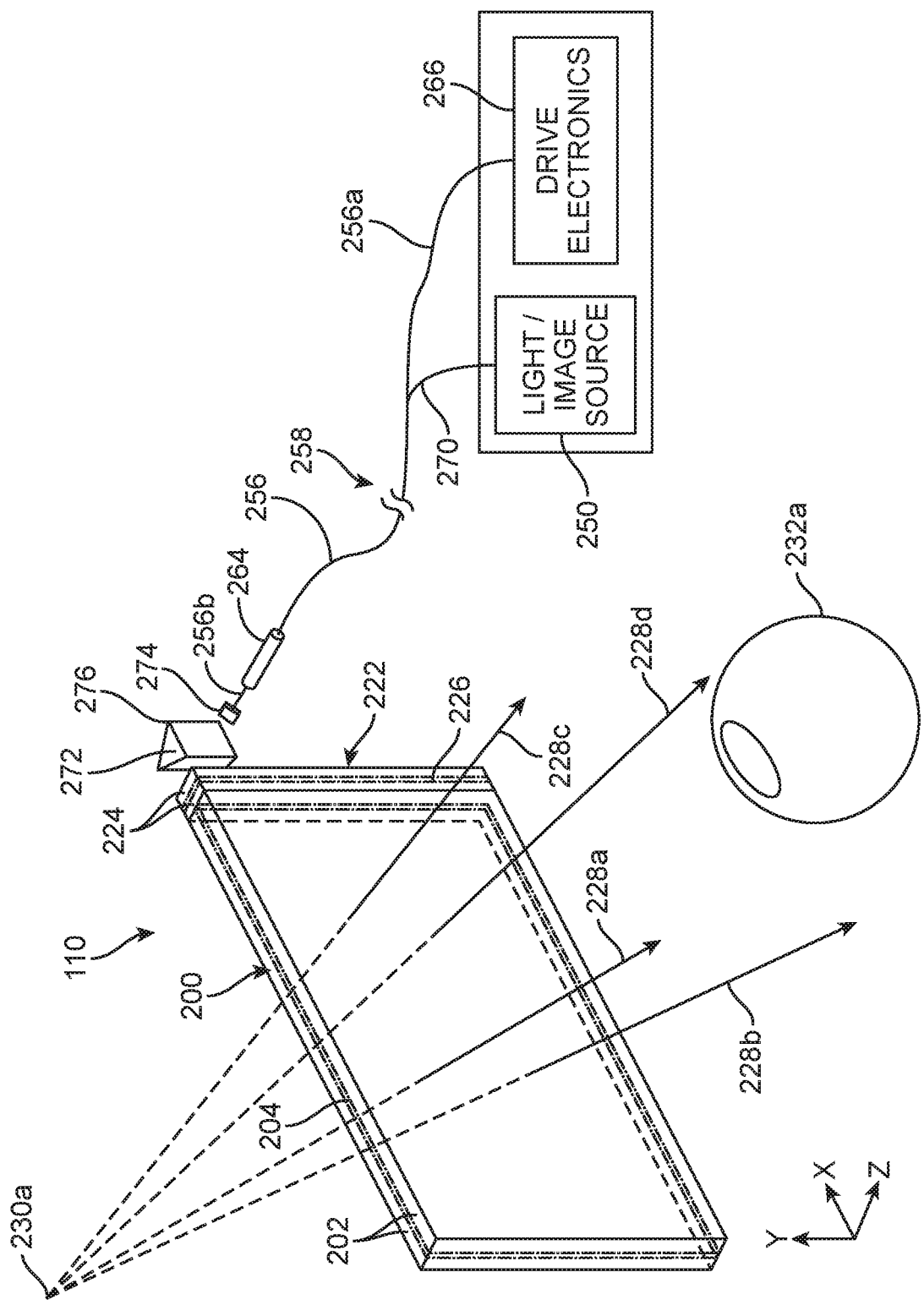
FIG. 13b is a perspective view of the display subsystem of FIG. 13a, particularly showing light rays extending from one focal point.
Figure 13C:
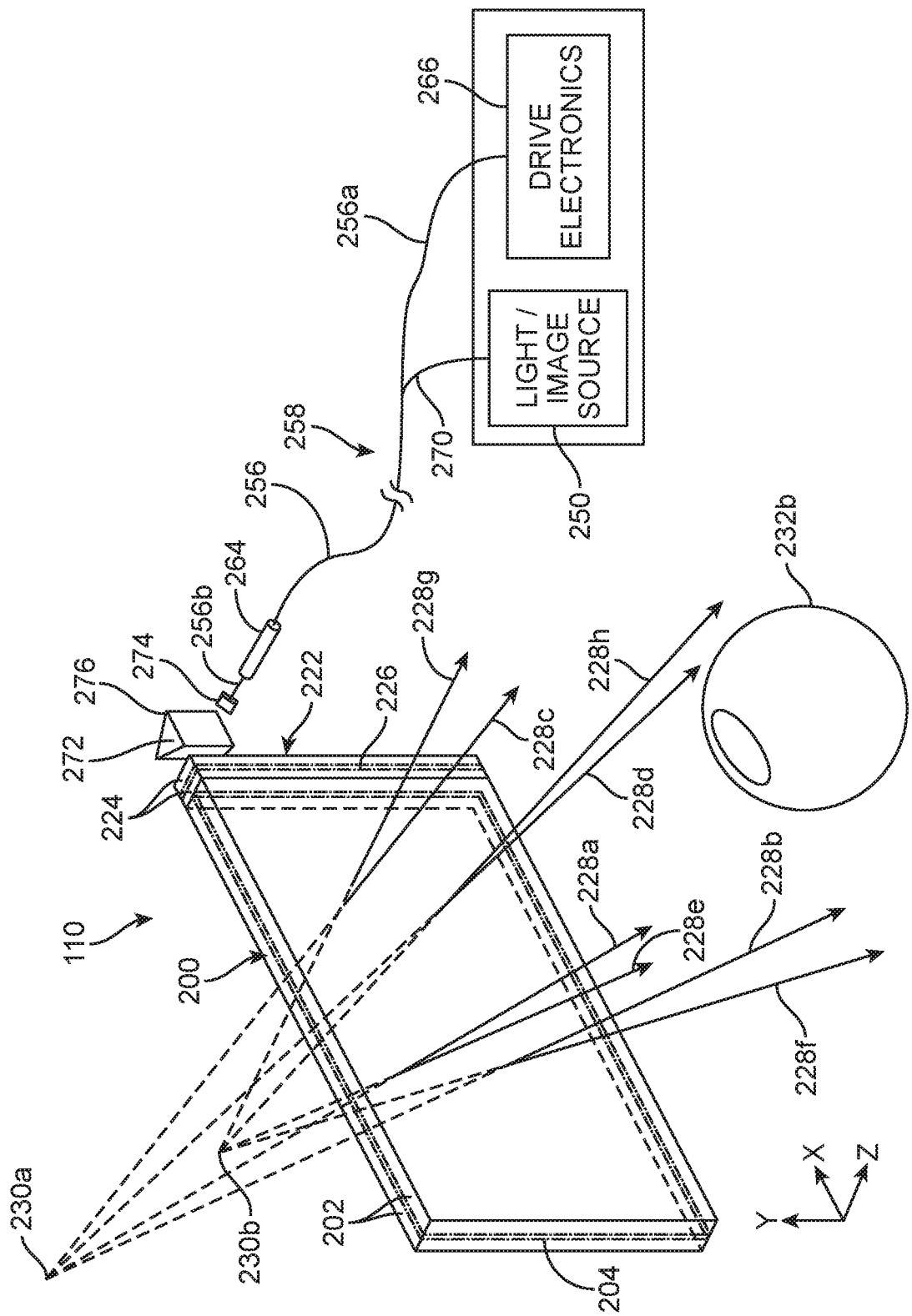
FIG. 13c is a perspective view of the display subsystem of FIG. 13a, particularly showing light rays extending from another focal point.

Referring to FIGS. 13*a*-13*c*, the display screen 110 comprises a distribution waveguide apparatus 222 to relay light along a first axis (vertical or Y-axis in FIG. 11*a*), and expand the light's effective exit pupil along the first axis (e.g., Y-axis). The distribution waveguide apparatus 222, may, for example include one or more distribution planar waveguides 224 (only one shown) and a DOE 226 (illustrated by double dash-dot line) associated with each of the distribution planar waveguides 224. The distribution planar waveguide 224 may be similar or identical in at least some respects to the primary waveguide 202, having a different orientation therefrom. Likewise, the DOE 226 may be similar or identical in at least some respects to the DOE 204. For example, the distribution planar waveguide 220 and/or DOE 226 may be comprised of the same materials as the primary waveguide 202 and/or DOE 204, respectively.

The relayed and exit-pupil expanded light is optically coupled from the distribution waveguide apparatus 222 into the primary waveguide 202. The primary waveguide 202 relays light along a second axis, preferably orthogonal to first axis, (e.g., horizontal or X-axis FIG. 13*a*). Notably, the second axis can be a non-orthogonal axis to the first axis. The primary waveguide 202 expands the light's effective exit pupil along that second axis (e.g. X-axis). In particular, the distribution planar waveguide 224 can relay and expand light along the vertical or Y-axis, and pass that light to the primary waveguide 202, which relays and expands light along the horizontal or X-axis.

The display screen 110 may generate an image at a single focus plane that is capable of being positioned closer than optical infinity. Collimated light propagates vertically, as shown in FIG. 13*b* along the distribution planar waveguide 224 by total internal reflection, and in doing so repeatedly intersects with the DOE 226. The DOE 226 preferably has a low diffraction efficiency (e.g., less than 50%). This causes a fraction (e.g., 10%) of the light to be diffracted toward an edge of the larger primary planar waveguide 202 at each point of intersection with the DOE 226, and a fraction of the light to continue on its original trajectory down the length of the distribution planar waveguide 224 via TIR. At each point of intersection with the DOE 226, additional light is diffracted toward the entrance of the primary waveguide 202. By dividing the incoming light into multiple outcoupled sets, the exit pupil of the light is expanded vertically by the DOE 226 in the distribution planar waveguide 224. This vertically expanded light coupled out of distribution planar waveguide 224 enters the edge of the primary waveguide 202.

Light entering the primary waveguide 202 propagates horizontally (as shown in FIG. 13b) along the primary waveguide 202 via TIR. The light intersects with the DOE 204 at multiple points as it propagates horizontally along at least a portion of the length of the primary waveguide 202 via TIR. The DOE 204 may advantageously be designed or configured to have a phase profile that is a summation of a linear diffraction grating and a radially symmetric diffractive lens. The DOE 204 may advantageously have a low diffraction efficiency. At each point of intersection between the propagating light and the DOE 204, a fraction of the light is diffracted toward the adjacent face of the primary waveguide 202 allowing the light to escape the TIR, and emerge from the face of the primary waveguide 202. The radially symmetric lens aspect of the DOE 204 additionally imparts a focus level to the diffracted light, both shaping the light wavefront (e.g., imparting a curvature) of the individual beam as well as steering the beam at an angle that matches the designed focus level. As illustrated in FIG. 13b, four beams 228a-228d extend geometrically to a focal point 228, and each beam is advantageously imparted with a convex wavefront profile with a center of radius at the focal point 228 to produce an image or virtual object 230a at a given focal plane.

With reference to FIG. 13c, the display screen 110 may generate a multi-focal volumetric display, image or light field. A first set of four beams 228a-228d extends geometrically to a focal point 230a, and each beam 228a-228d is advantageously imparted with a convex wavefront profile with a center of radius at the focal point 230a to produce another portion of the image or virtual object 232a at a respective focal plane. A second set of four beams 228e-228h extends geometrically to a focal point 230b, and each beam 228e-228h is advantageously imparted with a convex wavefront profile with a center of radius at focal point 230b to produce another portion of the image or virtual object 232b at a respective focal plane.

Figure 14:
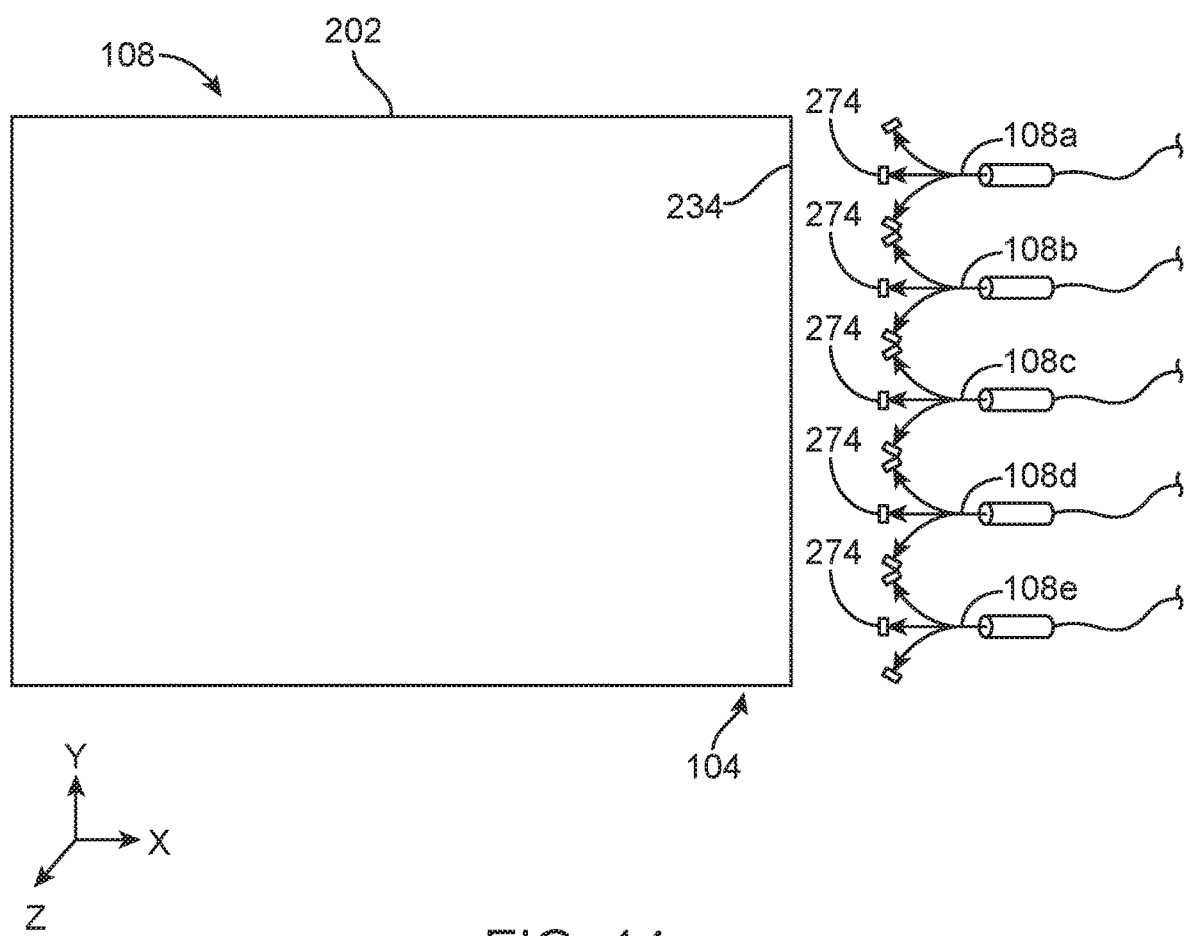
FIG. 14 is a plan view of another embodiment of a display subsystem for use in the virtual image generation system of FIG. 4.

In the embodiments of the display subsystem 104 illustrated in FIGS. 11-13, a single projection subsystem 108 is used to provide image data to the display screen 110. In contrast to the display system illustrated in FIGS. 11-13, the display subsystem 104 may comprise a plurality of projection subsystems 108a-108e (only five shown, collectively 108) to provide respective image data to the display screen 110, as illustrated in FIG. 14. The projection subsystems 108 are generally arrayed or arranged along are disposed along an edge 234 of the display screen 110. There may, for example, be a one to one (1:1) ratio or correlation between the number of planar waveguides 202 and the number of projection subsystems 108.

The display subsystem 104 can enable the use of a single primary planar waveguide 202. The multiple projection subsystems 108 can be disposed, for example, in a linear array along the edge 234 of a primary planar waveguide 202 that is closest to a temple of the end user's head. Each projection subsystem 108 injects modulated light encoding sub-image data into the primary planar waveguide 202 from a different respective position, thus generating different pathways of light. These different pathways can cause the light to be coupled out of the primary planar waveguide 202 by a multiplicity of DOEs at different angles, focus levels, and/or yielding different fill patterns at the exit pupil. Different fill patterns at the exit pupil can be beneficially used to create a light field display. Each layer in the stack or in a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image field with various focal depths.

Figure 15:
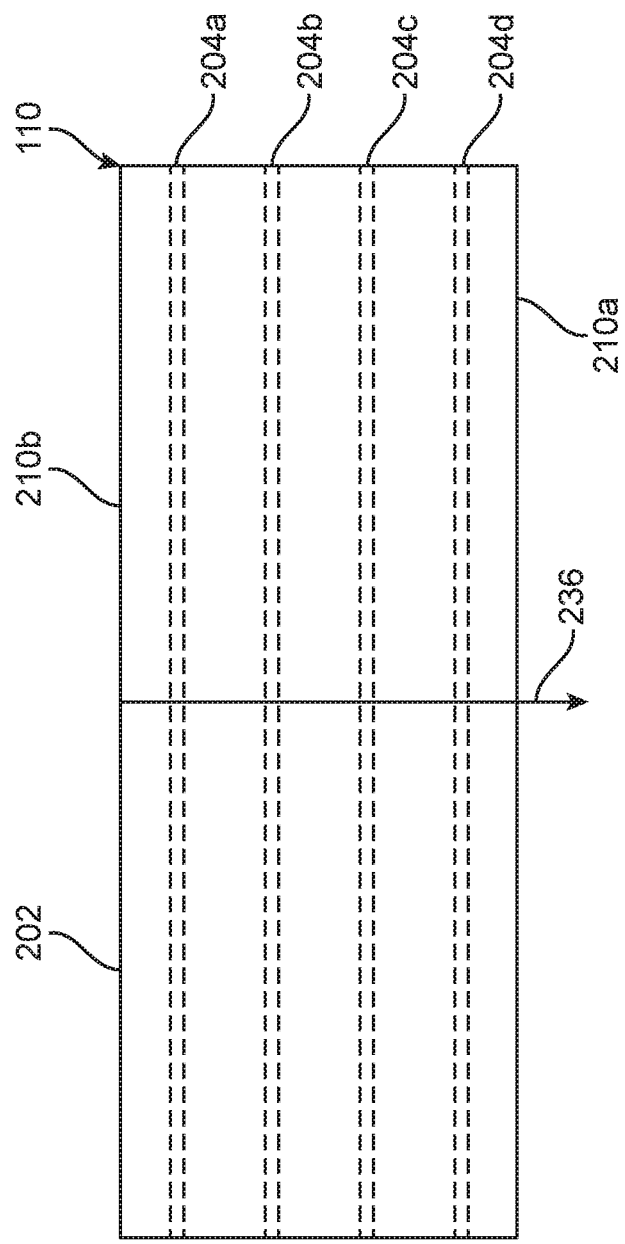
FIG. 15 is a plan view of one embodiment of a planar waveguide apparatus for use in the display subsystem of FIG. 13.

Referring now to FIG. 15, each planar waveguide 202 may include a plurality of DOEs 204a-204d (four illustrated, each as a double dash-dot line, collectively 204). The DOEs 204 are stacked, arrayed, or arranged along an axis 236 that is generally parallel to the field-of-view of the display screen 110. While illustrated as all being in the interior, in some implementations one, more or even all of the DOEs 204 may be on an exterior of the primary waveguide 202.

In some implementations, each DOE 204 may be capable of being independently switched ON and OFF. That is, each DOE 204 can be made active, such that the respective DOE 204 diffracts a significant fraction of light that intersects with the respective DOE 204, or it can be rendered inactive such that the respective DOE 204 either does not diffract light intersecting with the respective DOE 204 at all, or only diffracts an insignificant fraction of light. "Significant" in this context means enough light to be perceived by the human visual system when coupled out of the primary waveguide 202, and "insignificant" means not enough light to be perceived by the human visual system, or a low enough level to be ignored by a viewer.

The switchable DOEs 204 may be switched on one at a time, such that only one DOE 204 in the primary planar waveguide 202 is actively diffracting the light in the primary planar waveguide 202, to emerge from one or more faces 210 of the primary planar waveguide 202 in a perceptible amount. Alternatively, two or more DOEs 204 may be switched ON simultaneously, such that their diffractive effects are combined.

Each DOE 204 in the set of DOEs can have a different phase map. For example, each DOE 204 can have a respective phase map such that each DOE 204, when switched ON, directs light to a different position in X, Y, or Z. The DOEs 204 may, for example, vary from one another in their linear grating aspect and/or their radially symmetric diffractive lens aspect. If the DOEs 204 vary from one another in their diffractive lens aspect, different DOEs 204 (or combinations of DOEs 204) will produce sub-images at different optical viewing distances—i.e., different focus distances. If the DOEs 204 vary from one another in their linear grating aspect, different DOEs 204 will produce sub-images that are shifted laterally relative to one another. Such lateral shifts can be beneficially used to create a foveated display, to steer a display image with non-homogenous resolution or other non-homogenous display parameters (e.g., luminance, peak wavelength, polarization, etc.) to different lateral positions, to increase the size of the scanned image, to produce a variation in the characteristics of the exit pupil, and/or to generate a light field display. Lateral shifts may be advantageously employed to preform tiling or realize a tiling effect in generated images.

For example, a first DOE 204 in the set, when switched ON, may produce an image at an optical viewing distance of 1 meter (e.g., focal point 230b in FIG. 13c) for a viewer looking into the primary or emission face 210a of the primary waveguide 202. A second DOE 204 in the set, when switched ON, may produce an image at an optical viewing distance of 1.25 meters (e.g., focal point 230a in FIG. 13b)

for a viewer looking into the primary or emission face 210a of the primary waveguide 202. By switching exemplary DOEs 204 ON and OFF in rapid temporal sequence (e.g., on a frame-by-frame basis, a sub-frame basis, a line-by-line basis, a sub-line basis, pixel-by-pixel basis, or sub-pixel-by-sub-pixel basis) and synchronously modulating the image data being injected into the primary waveguide 202 by the projection subsystem 108, a composite multi-focal volumetric image is formed that is perceived to be a single scene to the viewer. By rendering different objects or portions of objects to sub-images relayed to the eye of the viewer (at location 232b in FIG. 13c) by the different DOEs 204, virtual objects or images are placed at different optical viewing distances, or a virtual object or image can be represented as a 3D volume that extends through multiple planes of focus.

Figure 16:
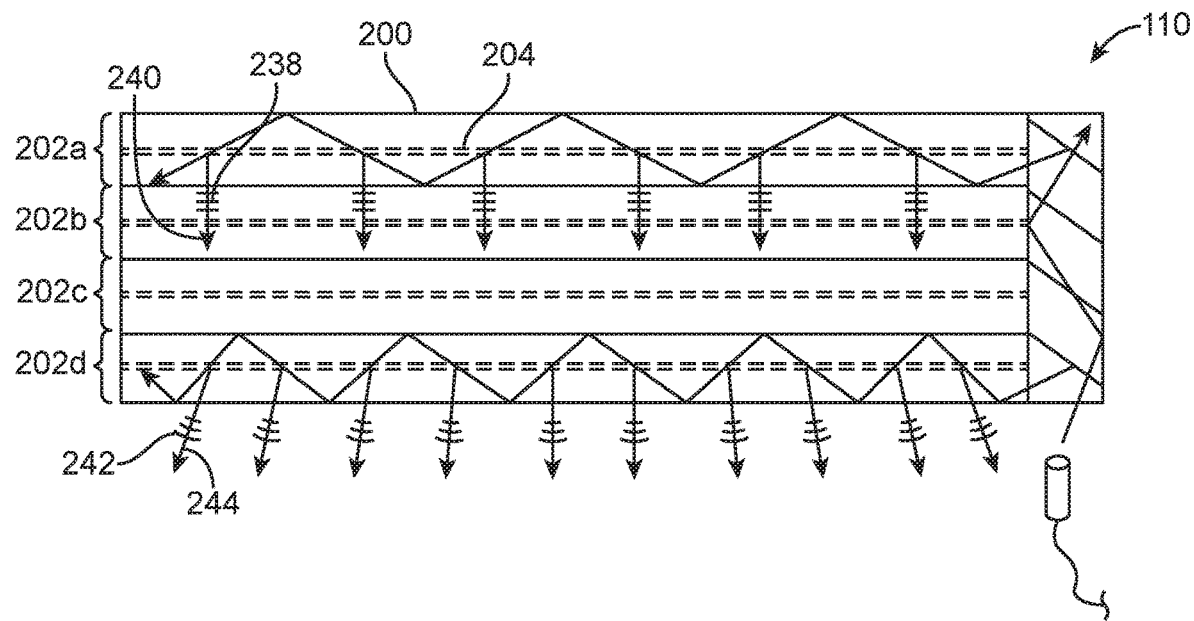
FIG. 16 is a plan view of another embodiment of a planar waveguide apparatus for use in the display subsystem of FIG. 13.

Referring now to FIG. 16, the display screen 110 may comprise a plurality of planar waveguides 202a-202d (four shown, collectively 202). The primary waveguides 202a-200d are stacked, arrayed, or arranged along an axis 236 that is generally parallel to the field-of-view of the display screen 110. Each of the primary waveguides 202 includes at least one DOE 204 (illustrated by dash-dot double line, only one called out in FIG. 16). While illustrated as all being in the interior, in some implementations one, more or even all of the DOEs 204 may be on an exterior of the primary waveguides 202. Additionally or alternatively, while illustrated with a single linear array of DOEs 204 per planar waveguide 202, one or more of the primary waveguides 202 may include two or more stacked, arrayed or arranged DOEs 204, similar to the implementation described with respect to FIG. 15.

Each of the primary waveguides 202 may function analogously to the operation of the DOEs 204 in the embodiment of FIG. 15. That is, the DOEs 204 of the respective planar waveguides 202 may each have a respective phase map, the phase maps of the various DOEs 204 being different from one another. While dynamic switching (e.g., ON/OFF) of the DOEs 204 was employed in the embodiment of FIG. 15, such can be avoided in the embodiment of FIG. 16. Instead of, or in additional to dynamic switching, the display system 110 may selectively route light to the primary waveguides 202 based on the respective phase maps. Thus, rather than turning ON a specific DOE 204 having a desired phase map, the display system 110 may route light to a specific planar waveguide 202 that has or is associated with a DOE 204 with the desired phase mapping. Again, this may be in lieu of, or in addition to, dynamic switching of the DOEs 204.

In one example, the projection subsystems may be selectively operated to selectively route light to the primary waveguides 202 based on the respective phase maps. In another example, each DOE 204 may be capable of being independently switched ON and OFF, similar to as explained with reference to switching DOEs 204 ON and OFF in the embodiment of FIG. 15. The DOEs 204 may be switched ON and OFF to selectively route light to the primary waveguides 202 based on the respective phase maps.

Figure 17:
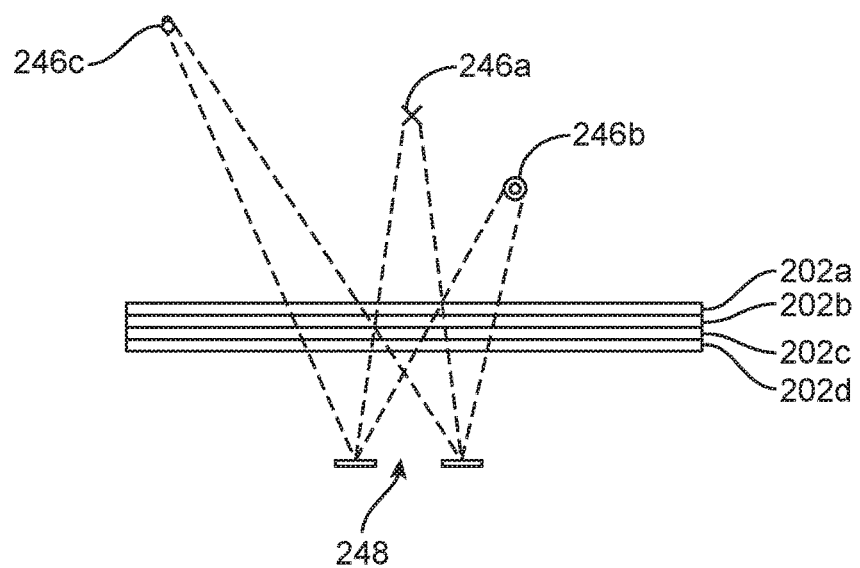
FIG. 17 is a profile view of the planar waveguide apparatus of FIG. 16.

As illustrated in FIG. 16, light rays outwardly emanate from two of the primary waveguides 202a, 202d. For sake of illustration, a first planar waveguide 202a produces a plane or flat wavefront (illustrated by flat lines 238 about rays 240, only one instance of each called out for sake of drawing clarity) at an infinite focal distance. In contrast, another one of the primary waveguides 202d produces a convex wavefront (illustrated by arc 242 about rays 244, only one instance of each called out for sake of drawing clarity) at a defined focal distance less than infinite (e.g., 1 meter). As illustrated in FIG. 17, the primary waveguides 202 may laterally shift the appearance and/or optical viewing distances—i.e., different focus distances of a virtual object 246a-246c with respect to an exit pupil 248.

Referring back to FIGS. 11-13, the projection subsystem 108 includes one or more light sources 250 that produces the light (e.g., emits light of different colors in defined patterns), a scanning device 252 that scans the light in a predetermined scan pattern (e.g., such as those described above with respect to FIGS. 5-9) in response to control signals, and an optical coupling subsystem 254 that couples the light from the scanning device 252 into the display screen 110.

The light source(s) 250 may take any of a large variety of forms, for instance, a set of RGB lasers (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient.

The scanning device 252 comprises one or more optical fibers 256 (e.g., single mode optical fiber), each of which has a proximal end 256a into which light is received from the light source(s) 250 and a distal end 256b from which light is provided to the partially transparent display screen 110. The scanning device 252 further comprises a mechanical drive assembly 258 to which the optical fiber 256 is mounted. The drive assembly 258 is configured for displacing the distal end 256b of the optical fiber 256 about a fulcrum 260 in accordance with a scan pattern, such that the outputted light diverges from a longitudinal axis 262 coincident with the fulcrum 260.

The drive assembly 208 comprises a piezoelectric element 264 to which the optical fiber 256 is mounted, and drive electronics 266 configured for conveying electrical signals to the piezoelectric element 264, thereby causing the distal end 256b of the optical fiber 256 to vibrate in accordance with the scan pattern. Thus, operation of the light source(s) 250 and drive electronics 266 are coordinated in a manner that generates image data that is encoded in the form of light that is spatially and/or temporally varying.

In the illustrated embodiment, the piezoelectric element 264 takes the form of a hollow tube, in which case, the distal end 256b of the optical fiber 256 is threaded or received through the piezoelectric tube 264. The distal end 256b of the optical fiber 256 protrudes from the piezoelectric tube 264 as a fixed-free flexible cantilever 268 (shown in FIGS. 18a and 18b). The piezoelectric tube 264 is associated with four quadrant electrodes (not illustrated). The electrodes may, for example, be plated on the outside, outer surface or outer periphery or diameter of the piezoelectric tube 264. A core electrode (not illustrated) is also located in a core, center, inner periphery or inner diameter of the tube 264.

Figure 18A:
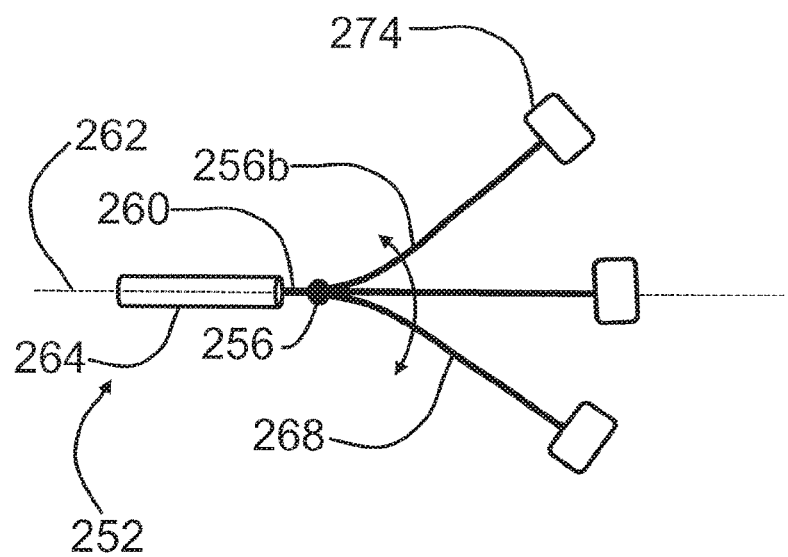
FIG. 18a is a plan view of one embodiment of an optical coupling subsystem and scanning device that can be used in the display subsystem of FIG. 13, particularly showing vibration of the optical fiber in a first order vibration mode.
Figure 18B:
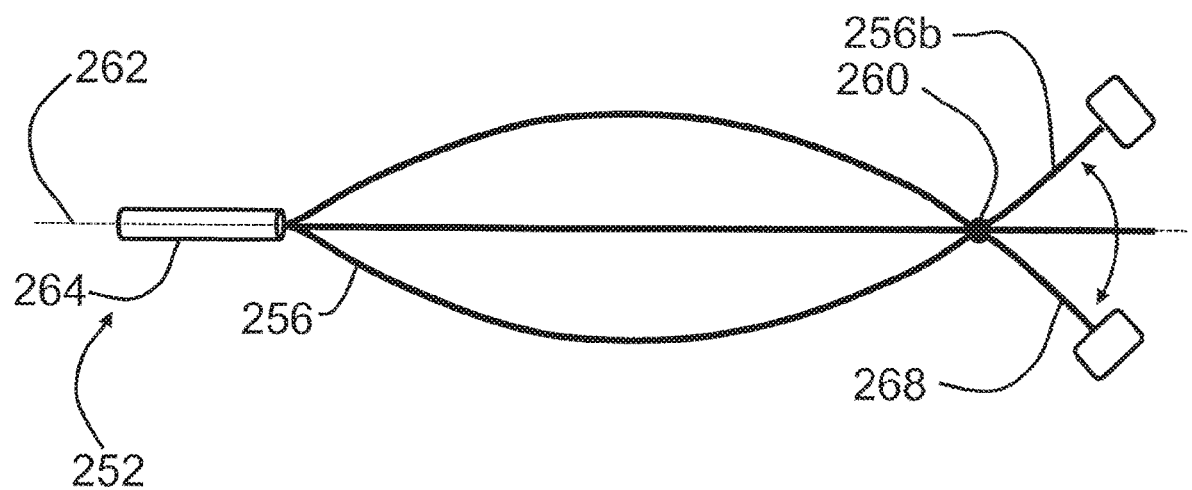
FIG. 18b is a plan view of the optical coupling subsystem and scanning device of FIG. 18a, particularly showing vibration of the optical fiber in a second order vibration mode.

The drive electronics 266 are electrical coupled via wires 270 to drive opposing pairs of electrodes (not shown) to bend the piezoelectric tube 264 in two axes independently. The protruding distal tip 256a of the optical fiber 256 has mechanical modes of resonance. The frequencies of resonance depend upon a diameter, length, and material properties of the optical fiber 256. By vibrating the piezoelectric tube 264 near a first mode of mechanical resonance of the fiber cantilever 268, the fiber cantilever 268 is caused to vibrate, and can sweep through large deflections about the fulcrum 260, as illustrated in FIG. 18a. Alternatively, the piezoelectric tube 264 may be vibrated near a higher order mode (e.g., second order mode) of mechanical resonance of the fiber cantilever 268, such that the fiber cantilever 268, sweeps through smaller deflections about the fulcrum 260, as illustrated in FIG. 18b.

By stimulating resonant vibration in two axes, the tip of the fiber cantilever 268 is scanned biaxially in an area filling 2D scan. By modulating an intensity of the light source(s) 250 in synchrony with the scan of the fiber cantilever 268, light emerging from the fiber cantilever 268 forms an image. Descriptions of such a set up are provided in U.S. patent application Ser. No. 13/915,530, International Patent Application Ser. No. PCT/US2013/045267, and U.S. Provisional Patent Application Ser. No. 61/658,355, all of which are incorporated by reference herein in their entireties.

As briefly discussed above, the optical coupling subsystem 254 optically couples light from the scanning device 252 to the waveguide apparatus 102. The optical coupling subsystem 254 includes an optical waveguide input apparatus 272, for instance, one or more reflective surfaces, diffraction gratings, mirrors, dichroic mirrors, or prisms to optically couple light into the end of the waveguide apparatus 102.

The optical coupling subsystem 254 includes a collimation element 274 that collimates light from the optical fiber 256. Significantly, the collimation element 274 is mounted to the distal end 256b of the optical fiber 256. Because the collimation element 274 will move with the distal end 256b of the optical fiber 256, the movement of the optical fiber 256 (e.g., lateral deflection, radius of sweep/curvature, and tip angle) need not be accommodated by the collimation element 274, thereby substantially reducing its complexity and size. For example, the collimation element 274 may comprise a single lens. In addition, the mass of the collimation element 274 enhances the whipping action of the optical fiber 256, thereby increasing the field of view of the display. Since the collimation element 274 is mounted to the optical fiber 256, the angle of the collimation element 274 need not be perpendicular to the curvature of the sweep. Thus, it can be appreciated that mounting the collimation element 274 on the distal end 256b of the optical fiber 256 relaxes the constraints of the display system 104.

Optionally, the optical coupling subsystem 254 comprises an optical modulation apparatus (not shown) configured for converging the light from the collimation element 274 towards the longitudinal axis 262, and in the illustrated embodiment, converging the light on a focal point in the center of the optical waveguide input apparatus 272, thereby allowing the size of the optical waveguide input apparatus 272 to be minimized, as discussed in further details in U.S. Provisional Patent Application Ser. No. 62/238,052, entitled "Virtual/Augmented Reality System Having Reverse Angle Diffraction Grating," which is expressly incorporated herein by reference.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. Thus, the present inventions are intended to cover alternatives, modifications, and equivalents, which may be included within the spirit and scope of the present inventions as defined by the claims.

What is claimed is:

1. A display subsystem for a virtual image generation system for use by an end user, comprising:
    a planar waveguide apparatus comprising multiple waveguides;
    an optical fiber;
    at least one light source configured for emitting light from a distal end of the optical fiber;
    a collimation element mounted to a distal end of the optical fiber for collimating the light emitted from the optical fiber;
    a mechanical drive assembly to which the optical fiber is mounted, the mechanical drive assembly configured for displacing the distal end of the optical fiber, along with the collimation element, about a fulcrum in accordance with a scan pattern, such that the light outputted from the optical fiber diverges into diverged light from a longitudinal axis coincident with the fulcrum;
    an optical modulation apparatus configured for converging the light from the collimation element towards the longitudinal axis into converged light and further converging the diverged light from a plurality of off-axis scanning positions of the optical fiber on a single focal point along the longitudinal axis, and the single focal point is located within at least one waveguide of the multiple waveguides in the planar waveguide apparatus is located along the longitudinal axis, the optical modulation apparatus including at least one diffraction grating having a diffraction pattern that corresponds to a geometry of the scan pattern; and
    an optical waveguide input apparatus configured for directing the converged light from the optical modulation apparatus down the planar waveguide apparatus, such that the planar waveguide apparatus displays one or more image frames to the end user.

2. A display subsystem for a virtual image generation system for use by an end user, comprising:
    a planar waveguide apparatus comprising multiple waveguides;
    an optical fiber;
    at least one light source configured for emitting light from a distal end of the optical fiber;
    a collimation element mounted to a distal end of the optical fiber for collimating the light emitted from the optical fiber that is mounted to the mechanical drive assembly as a fixed-free flexible cantilever;
    a mechanical drive assembly to which the optical fiber is mounted, the mechanical drive assembly configured for displacing the distal end of the optical fiber, along with the collimation element, about a fulcrum in accordance with a scan pattern, such that the light outputted from the optical fiber diverges from a longitudinal axis coincident with the fulcrum;
    an optical modulation apparatus configured for converging the light from the collimation element towards the longitudinal axis into converged light, the optical modulation apparatus including at least one diffraction grating having a diffraction pattern that corresponds to a geometry of the scan pattern; and
    an optical waveguide input apparatus configured for directing the converged light from the optical modulation apparatus down the planar waveguide apparatus, such that the planar waveguide apparatus displays one or more image frames to the end user, wherein
        the display subsystem further comprises means for reducing or minimizing a size of the optical waveguide input apparatus,
        the means for reducing or minimizing the size of the optical waveguide input apparatus comprises at least the optical modulation apparatus.

3. The display subsystem of claim 1, wherein the collimation element comprises a lens, and the optical waveguide input apparatus comprises a distribution waveguide and multiple diffractive optical elements, each diffractive optical element corresponds to a respective waveguide of the multiple waveguides, the distribution waveguide interfaces with the each diffractive optical element of the multiple diffractive optical elements, and the optical modulation apparatus converges the light on a focal point located within an optical diffractive element of the multiple diffractive optical elements.

4. The display subsystem of claim 3, further comprising means for reducing or minimizing a size of at least one diffractive optical element of the multiple diffractive optical elements, wherein the at least one diffractive optical element is incorporated into the planar waveguide apparatus.

5. The display subsystem of claim 4, wherein the collimation element comprises a single microlens, the display subsystem further comprises means for increasing a field of view provided by the display subsystem to the end user, and the collimation element is configured to collimate the light emitted from the optical fiber without having to accommodate movements of the optical fiber.

6. The display subsystem of claim 1, wherein the mechanical drive assembly comprises a piezoelectric element to which the optical fiber is mounted and further comprises drive electronics configured for conveying electrical signals to the piezoelectric element, thereby causing the optical fiber to vibrate in accordance with the scan pattern, the piezoelectric element accommodates a portion of the optical fiber and includes multiple pairs of electrical contacts that displace the distal end of the optical fiber in multiple dimensions independently, and at least one electrical contact of the multiple pairs of electrical contacts is formed on a portion of an outer surface or outer periphery of the piezoelectric element.

7. The display subsystem of claim 1, wherein the optical fiber is vibrated in a first order vibration mode about the fulcrum or in a second order vibration mode about the fulcrum.

8. The display subsystem of claim 1, wherein the optical fiber is controlled to vibrate in accordance with the scan pattern having the geometry to which the at least one diffraction grating corresponds.

9. The display subsystem of claim 1, wherein the planar waveguide apparatus comprises the multiple waveguides configured for respectively displaying the one or more image frames at a plurality of different focal points to the end user, and the optical waveguide input apparatus is configured for directing the light from the collimation element down the multiple waveguides.

10. The display subsystem of claim 9, wherein the optical waveguide input apparatus comprises a plurality of diffractive optical elements respectively extending parallel along the multiple waveguides, the plurality of diffractive optical elements respectively directing the light from the collimation element down the multiple waveguides.

11. The display subsystem of claim 9, wherein the optical waveguide input apparatus comprises a distribution waveguide extending perpendicularly to the multiple waveguides of the planar waveguide apparatus, the distribution waveguide comprises a plurality of diffraction gratings that respectively direct the light from the collimation element down the multiple waveguides.

12. The display subsystem of claim 1, further comprising multiple projection subsystems configured to project images, wherein each of the multiple projection subsystems comprises a respective optical fiber, and a number of the multiple waveguides in the planar waveguide apparatus and a number of the projection subsystems are configured according to a predetermined ratio.

13. The display subsystem of claim 1, wherein the planar waveguide apparatus has a partially transparent display screen configured for being positioned between eyes of the end user and an ambient environment to provide a field of view to the end user.

14. The display subsystem of claim 1, further comprising a processing and data module and a frame structure, the frame structure configured for being worn on a head of the end user, the frame structure carrying the planar waveguide apparatus, and the processing and data module removably attached to a body of the end user.

15. A virtual image generation system for use by an end user, comprising:
    memory storing a three-dimensional scene;
    a control subsystem configured for rendering a plurality of synthetic image frames of the three-dimensional scene; and
    the display subsystem of claim 1, the display subsystem configured for sequentially displaying the plurality of synthetic image frames to the end user.

16. The virtual image generation system of claim 15, wherein the at least one diffraction grating includes a single diffraction grating having a first diffraction element and a second diffraction element different from the first diffraction element, the first diffraction element in the single diffraction grating diffracts a first portion of the diverged light toward a single focal point within a waveguide of the multiple waveguides, and the second diffraction element in the single diffraction grating diffracts a second portion of the diverged light toward the single focal point to form the converged light.

17. A display subsystem for a virtual image generation system for use by an end user, comprising:
    a planar waveguide apparatus comprising multiple waveguides;
    an optical fiber;
    at least one light source configured for emitting light from a distal end of the optical fiber;
    a collimation element mounted to a distal end of the optical fiber for collimating the light emitted from the optical fiber;
    a mechanical drive assembly to which the optical fiber is mounted, the mechanical drive assembly configured for displacing the distal end of the optical fiber, along with the collimation element, about a fulcrum in accordance with a scan pattern, such that the light outputted from the optical fiber diverges into diverged light from a longitudinal axis coincident with the fulcrum;
    an optical modulation apparatus configured for converging the light from the collimation element towards the longitudinal axis into converged light, the optical modulation apparatus including at least one diffraction grating having a diffraction pattern that corresponds to a geometry of the scan pattern, wherein
        the at least one diffraction grating includes a single diffraction grating having a first diffraction element and a second diffraction element different from the first diffraction element,
        the first diffraction element in the single diffraction grating diffracts a first portion of the diverged light toward a single focal point within a waveguide of the multiple waveguides, and the second diffraction element in the single diffraction grating diffracts a second portion of the diverged light toward the single focal point to form the converged light; and an optical waveguide input apparatus configured for directing the converged light from the optical modulation apparatus down the planar waveguide apparatus, such that the planar waveguide apparatus displays one or more image frames to the end user.

18. The display subsystem of claim 1, wherein the at least one diffraction grating in the optical modulation apparatus includes a first diffraction grating and a second diffraction grating that is orthogonal to the first diffraction grating, the first and second diffractions are arranged in series to diffract the diverged light, the first diffraction grating diffracts at least a first portion of the diverged light into a first direction, the second diffraction grating diffracts at least the first portion of the diverged light from the first diffraction grating into a second direction toward a single focal point within a waveguide in the multiple waveguides to form the converged light, and the second direction is orthogonal to the first direction.

19. The display subsystem of claim 1, wherein the optical diffractive element converges the light from a plurality of off-axis scanning positions of the optical fiber.

* * * * *